United States Patent
Omino et al.

(10) Patent No.: US 9,531,534 B2
(45) Date of Patent: Dec. 27, 2016

(54) GENERATING DEVICE, RE-ENCRYPTING DEVICE, METHOD, AND COMPUTER PROGRAM PRODUCT

(71) Applicant: Kabushiki Kaisha Toshiba, Minato-ku (JP)

(72) Inventors: Tsukasa Omino, Ota-ku (JP); Yuichi Komano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 175 days.

(21) Appl. No.: 14/326,913

(22) Filed: Jul. 9, 2014

(65) Prior Publication Data

US 2015/0016606 A1    Jan. 15, 2015

(30) Foreign Application Priority Data

Jul. 12, 2013   (JP) .................................. 2013-146888

(51) Int. Cl.
   *H04L 9/08*   (2006.01)

(52) U.S. Cl.
   CPC .............. *H04L 9/0819* (2013.01); *H04L 9/085* (2013.01); *H04L 9/0869* (2013.01); *H04L 9/0891* (2013.01); *H04L 2209/88* (2013.01)

(58) Field of Classification Search
   CPC .......... H04L 9/002; H04L 9/006; H04L 9/008; H04L 9/08; H04L 9/0816; H04L 9/0819; H04L 9/0822; H04L 9/0825; H04L 9/0827; H04L 9/083; H04L 9/0833; H04L 9/0836; H04L 9/0838; H04L 9/0847; H04L 9/085; H04L 9/0861; H04L 9/0869; H04L 9/0877; H04L 9/0891; H04L 9/0894; H04L 9/0897; H04L 9/14; H04L 9/16; H04L 9/28; H04L 9/30; H04L 2209/20; H04L 2209/24; H04L 2209/76; H04L 2209/122; H04L 2463/061; H04L 2463/062; H04L 63/0281; H04L 63/04; H04L 63/0428; H04L 63/0442; H04L 63/045; H04L 63/0464; H04L 63/0471; H04L 64/0478; H04L 64/06; H04L 64/062; H04L 64/064; H04L 64/065; H04L 64/068; H04L 64/20; H04L 64/205; H04W 12/02; H04W 12/04; G06F 21/60; G06F 21/602; G06F 21/606; G06F 21/62; G06F 21/6209
   See application file for complete search history.

(56) References Cited

U.S. PATENT DOCUMENTS

| 6,041,123 A * | 3/2000 | Colvin, Sr. ............. H04L 9/083 713/153 |
| 6,636,968 B1 * | 10/2003 | Rosner .................. H04L 9/0833 713/178 |

(Continued)

FOREIGN PATENT DOCUMENTS

| JP | 6-236147 A | 8/1994 |
| JP | 11-252065 A | 9/1999 |

(Continued)

OTHER PUBLICATIONS

C. E. Shannon, Communication Theory of Secrecy Systems, Bell Technical Journal, vol. 28, No. 4, (1949), pp. 656-715.

*Primary Examiner* — Jung Kim
*Assistant Examiner* — Christopher Ruprecht
(74) *Attorney, Agent, or Firm* — Oblon, McClelland, Maier & Neustadt, L.L.P.

(57) ABSTRACT

According to an embodiment, a generating device includes a first key generator, a second key generator, an output unit, and an update unit. The first key generator is configured to generate a first key that is a sequence of bits according to a (Continued)

first key rule on the basis of a random number. The second key generator is configured to generate multiple second keys that are sequences of bits partially having correlation with one another according to a second key rule on the basis of the first key. The output unit is configured to output the first key and at least one of the second keys. The update unit is configured to generate update information for updating a second key by updating a partial sequence of the second key, the partial sequence having no correlation with the other second keys not to be updated.

12 Claims, 28 Drawing Sheets

(56) References Cited

U.S. PATENT DOCUMENTS

| | | | | |
|---|---|---|---|---|
| 9,049,011 B1* | 6/2015 | Agrawal | | H04L 9/085 |
| 2003/0194086 A1* | 10/2003 | Lambert | | G06F 7/725 |
| | | | | 380/44 |
| 2006/0034456 A1* | 2/2006 | McGough | | H04L 9/0844 |
| | | | | 380/30 |
| 2007/0294362 A1* | 12/2007 | Patel | | G06F 8/65 |
| | | | | 709/217 |
| 2008/0059787 A1* | 3/2008 | Hohenberger | | H04L 9/3013 |
| | | | | 713/153 |
| 2008/0152149 A1* | 6/2008 | Bauchot | | H04L 12/189 |
| | | | | 380/279 |
| 2008/0170701 A1* | 7/2008 | Matsuo | | H04L 63/0442 |
| | | | | 380/281 |
| 2009/0103726 A1* | 4/2009 | Ahmed | | H04L 9/0668 |
| | | | | 380/46 |
| 2009/0210697 A1* | 8/2009 | Chen | | H04L 9/0861 |
| | | | | 713/153 |
| 2010/0014664 A1* | 1/2010 | Shirai | | H04L 9/0618 |
| | | | | 380/44 |
| 2010/0217987 A1* | 8/2010 | Shevade | | G06F 21/6272 |
| | | | | 713/175 |
| 2010/0290627 A1* | 11/2010 | Tsuji | | H04L 9/0825 |
| | | | | 380/282 |
| 2011/0317837 A1* | 12/2011 | Smith | | H04L 9/0656 |
| | | | | 380/259 |
| 2012/0140923 A1* | 6/2012 | Lee | | H04L 9/0894 |
| | | | | 380/45 |
| 2014/0115321 A1* | 4/2014 | Isshiki | | H04L 9/3073 |
| | | | | 713/153 |
| 2014/0294176 A1 | 10/2014 | Endo et al. | | |
| 2015/0067330 A1* | 3/2015 | Khan | | H04L 9/3013 |
| | | | | 713/168 |
| 2015/0271153 A1* | 9/2015 | Rohloff | | H04L 63/0464 |
| | | | | 713/153 |

FOREIGN PATENT DOCUMENTS

| | | |
|---|---|---|
| JP | 2007-143091 A | 6/2007 |
| JP | 2012-80214 A | 4/2012 |
| JP | 2014-192612 A | 10/2014 |

* cited by examiner

GENERATING DEVICE, RE-ENCRYPTING DEVICE, METHOD, AND COMPUTER PROGRAM PRODUCT

CROSS-REFERENCE TO RELATED APPLICATION

This application is based upon and claims the benefit of priority from Japanese Patent Application No. 2013-146888, filed on Jul. 12, 2013; the entire contents of which are incorporated herein by reference.

FIELD

Embodiments described herein relate generally to a generating device configured to generate an encryption key, a re-encrypting device, a method therefor, and a computer program product therefor.

BACKGROUND

Medical data such as personal medical histories or health information is stored for a long time to keep track of physical conditions that could possibly develop into illness in the future or to allow proper medical treatments. Any leakage of such information causes serious damage because medical information contains personal information.

The risk of information leakage increases as the retention term increases. Examples of known technologies for securely keeping information concealed for a long time include encryption technologies that information-theoretically ensure security.

When an encryption technology that information-theoretically ensures security is used, a communication device requires, for each communication counterpart, an encryption key having the same length as the plaintext to be communicated. Therefore, the size of the encryption key to be managed by the communication device is increased when there are a large number of communication counterparts or when a long plaintext is to be communicated. It is therefore desirable to reduce the entire size of multiple encryption keys stored by multiple communication counterparts and to collectively manage the encryption keys.

Furthermore, since an encryption key having the same bit length as a plaintext is required for encryption, continuous encrypted communication requires a certain number of times of encryption or updating every predetermined time period. If the entire size of multiple encryption keys is reduced and the encryption keys are collectively managed, these encryption keys have to be collectively updated. Thus, even if some of multiple encryption keys need to be updated, all of the encryption keys have to be updated.

DETAILED DESCRIPTION

According to an embodiment, a generating device includes a first key generator, a second key generator, an output unit, and an update unit. The first key generator is configured to generate a first key that is a sequence of bits according to a first key rule for generating the first key on the basis of a random number. The second key generator is configured to generate multiple second keys that are sequences of bits partially having correlation with one another according to a second key rule for generating the second keys on the basis of the first key. The output unit is configured to output the first key and at least one of the second keys. The update unit is configured to generate update information for updating any one of the second keys by updating a partial sequence of the any one of the second keys, the partial sequence having no correlation with the other second keys not to be updated.

First Embodiment

Figure 1:
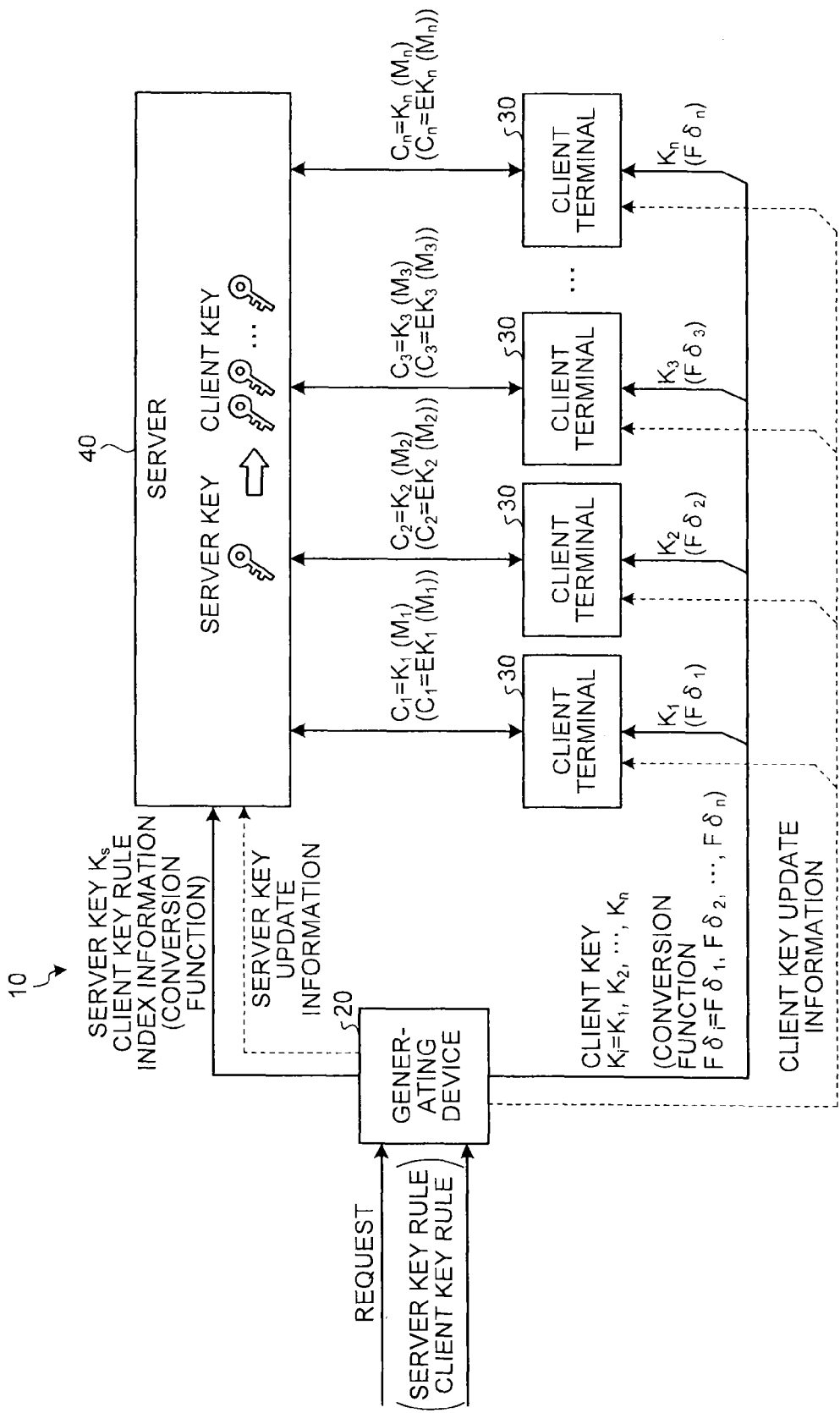
FIG. 1 is a schematic diagram of the configuration of an encryption system according to a first embodiment.

FIG. 1 is a schematic diagram of the configuration of an encryption system 10 according to a first embodiment. The encryption system 10 includes a generating device 20, a plurality of client terminals 30, and a server 40.

The generating device 20 is an information processing device such as a computer. The generating device 20 generates a server key (first key) $K_S$ from a random number based on a server key rule (first key rule). The generating device 20 also generates a plurality of (n, in this example) client keys (second keys) $K_i$ (=$K_1$, $K_2$, ..., $K_n$) each of which is a bit sequence partly having a correlation with one another from the server key $K_S$ based on a client key rule (second key rule).

Here, n represents the number of client keys $K_i$ generated from one server key $K_S$, and is an integer equal to or larger than two; i is a value for identifying each of the client keys $K_i$, and referred to as an index; and i is associated with each of the client keys $K_i$, and is an integer equal to or larger than one and equal to or smaller than n, in this example.

Each of the n client keys $K_i$ is a bit sequence for encrypting a plaintext to generate a ciphertext, and for decrypting the ciphertext into the plaintext. In other words, the client key $K_i$ is an encryption key containing the same data sequence for the encryption and the decryption. Each of the n client keys $K_i$ is secret information managed confidentially.

Note that each of the n client keys $K_i$ may be a bit sequence that is a seed for generating an encryption key $EK_i$ (=$EK_1$, $EK_2$, ..., $EK_n$). Each of the encryption keys $EK_i$ is a bit sequence for encrypting a plaintext to generate a ciphertext, and for decrypting the ciphertext into the plaintext. Thus, when the client keys $K_i$ are seeds for generating the encryption keys $EK_i$, the client keys $K_i$ themselves do not serve as keys.

In this case, the generating device 20 generates a conversion function $F\delta_i$ (=$F\delta_1$, $F\delta_2$, ..., $F\delta_n$) in association with each of the client keys $K_i$. The conversion function $F\delta_i$ is a function, a program, or the like for causing a computer to convert bits. Examples of the conversion function $F\delta_i$ includes a one-to-one function and a pseudo-random function.

The server key $K_S$ is a bit sequence used as a seed for generating the n client keys $K_i$. The data sequence of the server key $K_S$ itself is not an encryption key for encrypting any plaintext. The server key $K_S$ is also secret information managed confidentially.

The server key rule and the client key rule are electronic data described in a computer-executable format, and is a function, a program, or the like executed by a computer, for example. The server key rule is a rule (e.g., a function or a program) for generating a server key $K_S$ from a random number. The client key rule is a rule (e.g., a function or a program) for generating client keys $K_i$ from the server key $K_S$.

More specifically, a client key rule is a rule for extracting one or more partial sequences from the server key $K_S$ and generating client keys $K_i$. In other words, a client key rule is a rule for determining a client key $K_i$. A client key $K_i$ is determined based on a first partial sequence set having one or more partial sequences as its elements. At least one partial sequence is shared between first partial sequence sets for two client keys $K_i$, among a plurality of client keys $K_i$. A partial sequence is partial information of the server key $K_S$.

The server key rule and the client key rule may be public information (in other words, information not concealed), or may be secret information managed confidentially.

The generating device 20 generates index information indicating association between the index i of a client key $K_i$ and each of the client terminals 30. One client terminal 30 may be associated with a plurality of indices i. The generating device 20 transmits each of the n client keys $K_i$ generated by the generating device 20 to a client terminal 30 associated with the index i. When the client keys $K_i$ are seeds for generating the encryption keys $EK_i$, the generating device 20 also transmits a conversion function $F\delta_i$ associated with each of the client keys $K_i$ to the client terminal 30.

The generating device 20 transmits the server key $K_S$ thus generated and the client key rule to the server 40. When a public client key rule is used, the generating device 20 does not need to transmit the client key rule to the server 40. The generating device 20 also transmits the index information to the server 40. When the client keys $K_i$ are seeds for generating the encryption keys $EK_i$, the generating device 20 also transmits a conversion function $F\delta_i$ associated with each of the indices i to the server 40.

The generating device 20 generates server key update information sri and client key update information cri for updating any of a plurality of client keys $K_i$ after a predetermined number of times of encrypted communication or after a lapse of a predetermined period from generation of the server key $K_S$ and the client keys $K_i$. The generating device 20 transmits the server key update information sri to the server 40. The generating device 20 also transmits the client key update information cri to a client terminal 30 storing a client key $K_i$ to be updated.

The server 40 is an example of an information processing device (first information processing device) configured to execute data processing. The server 40 receives the server key $K_S$ and the client key rule from the generating device 20. When a public client key rule is used, the server 40 acquires the client key rule from the source information processing device. The server 40 also receives the index information indicating association between each of the client terminals 30 and the index i of the associated client key $K_i$ received by that client terminal 30 from the generating device 20. When the client keys $K_i$ are seeds for generating the encryption keys $EK_i$, the server 40 also receives the conversion function $F\delta_i$ associated with each of the indices i from the generating device 20.

The server 40 receives the server key update information sri from the generating device 20 after a predetermined number of times of encrypted communication or after a lapse of a predetermined period from reception of the server key $K_S$. The server 40 updates at least one of the stored server key $K_S$ and client key rule on the basis of the received server key update information sri. When the client keys $K_i$ are seeds for generating the encryption keys $EK_i$, the server 40 may also update the conversion function $F\delta_i$ associated with client key $K_i$ to be updated on the basis of the received server key update information sri.

Each of the client terminals 30 is an example of another information processing device (second information processing device) configured to execute data processing. Each of the client terminals 30 may be various types of medical equipment or electronic devices provided with a build-in information processing device. Each of the client terminals 30 receives an associated client key $K_i$ from the generating device 20. When the client keys $K_i$ are seeds for generating the encryption keys $EK_i$, each of the client terminals 30 also receives the conversion function $F\delta_i$ associated with the client key $K_i$ from the generating device 20.

A client terminal 30 storing a client key $K_i$ to be updated receives the client key update information cri from the generating device 20 after a predetermined number of times of encrypted communication or after a lapse of a predetermined period from reception of the client key $K_i$. The client terminal 30 updates the stored client key $K_i$ on the basis of the received client key update information cri. When the client keys $K_i$ are seeds for generating the encryption keys $EK_i$, the client terminal 30 may also update the conversion function $F\delta_i$ on the basis of the received client key update information cri.

In the encryption system 10 having such a configuration, encrypted communications are established between the server 40 and each of the client terminals 30 using the client keys $K_i$. When ciphertexts are to be communicated from the client terminals 30 to the server 40, the following process is performed.

Each of the client terminals 30 generates a ciphertext $C_i$ (=$C_1, C_2, \ldots, C_n$) by encrypting a plaintext $M_i$ (=$M_1, M_2, \ldots, M_n$) by using an associated client key $K_i$ (=$K_1, K_2, \ldots, K_n$). As an example, each of the client terminals 30 generates a ciphertext $C_i$ by performing exclusive OR operation on the plaintext $M_i$ and the client key $K_i$ which have the same bit length as each other. Each of the client terminals 30 then transmits the ciphertext $C_i$ thus generated to the server 40.

When the client keys $K_i$ are seeds for generating the encryption keys $EK_i$, each of the client terminals 30 generates an encryption key $EK_i$ (=$EK_1, EK_2, \ldots, EK_n$) from the associated client key $K_i$ (=$K_1, K_2, \ldots, K_n$) and the associated conversion function $F\delta_i$ (=$F\delta_1, F\delta_2, \ldots, F\delta_n$). Here, $EK_i=F\delta_i(K_i)$ is satisfied. Each of the client terminals 30 then generates a ciphertext $C_i$ (=$C_1, C_2, \ldots, C_n$) by encryption using the associated encryption key $EK_i$ (=$EK_1, EK_2, \ldots, EK_n$).

The server 40 receives the ciphertext $C_i$ from the client terminal 30. The server 40 refers to the index information and detects the index i of the client key $K_i$ used in encrypting the ciphertext $C_i$ from the terminal information of the client terminal 30 having transmitted the ciphertext $C_i$. The server 40 inputs the detected index i and the server key $K_S$ to the client key rule to generate an associated client key $K_i$. The server 40 then generates the plaintext $M_i$ by decrypting the ciphertext $C_i$ using the client key $K_i$ thus generated. When the client keys $K_i$ are seeds for generating the encryption keys $EK_i$, the server 40 generates an encryption key $EK_i$ from the generated client key $K_i$ and the associated conversion function $F\delta_i$, and generates the plaintext $M_i$ using the encryption key $EK_i$ thus generated.

When a ciphertext is to be communicated from the server 40 to the client terminal 30, the following process is performed. The server 40 refers to the index information and detects the index i of the client key $K_i$ stored by a destination client terminal 30 from the terminal information of the destination client terminal 30. The server 40 inputs the detected index i and the server key $K_S$ to the client key rule to generate an associated client key $K_i$. The server 40 generates the ciphertext $C_i$ by encrypting the plaintext $M_i$ using the client key $K_i$. The server 40 then transmits the ciphertext $C_i$ thus generated to the associated client terminal 30. The client terminal 30 in receipt of the ciphertext $C_i$ generates the plaintext $M_i$ by decrypting the ciphertext $C_i$ with the client key $K_i$ stored on the client terminal 30.

When the client keys $K_i$ are seeds for generating the encryption keys $EK_i$, the server 40 generates an encryption key $EK_i$ from the generated client key $K_i$ and the associated conversion function $F\delta_i$, and generates the ciphertext $C_i$ by using the encryption key $EK_i$ thus generated. The client terminal 30 in receipt of the ciphertext $C_i$ generates the encryption key $EK_i$ from the stored client key $K_i$ and the associated conversion function $F\delta_i$, and generates the plaintext $M_i$ by using the encryption key $EK_i$ thus generated.

For example, the encryption system 10 having such a configuration allows the server 40 to collect and to collectively manage privacy information and the like stored by a large number of client terminals 30. For example, the encryption system 10 may be applied to a medical system in which the server 40 collects detection data from a plurality of sensors or the like (thermometers, sphygmomanometers, heart rate monitors) configured to detect the conditions of patients and collectively manages such detection data by causing such sensors to function as the client terminals 30. When an output of the detection data is required, the server 40 can generate a corresponding client key $K_i$ from the server key $K_S$ and the client key rule, and decrypts the detection data.

As an example, the encryption system 10 may also use a different server key $K_S$ and different client keys $K_i$ for each given group (for each hospital, for each hospital ward, for each hospital department, or for each responsible doctor), so that the confidentiality to those external to the group can be enhanced.

Figure 2:
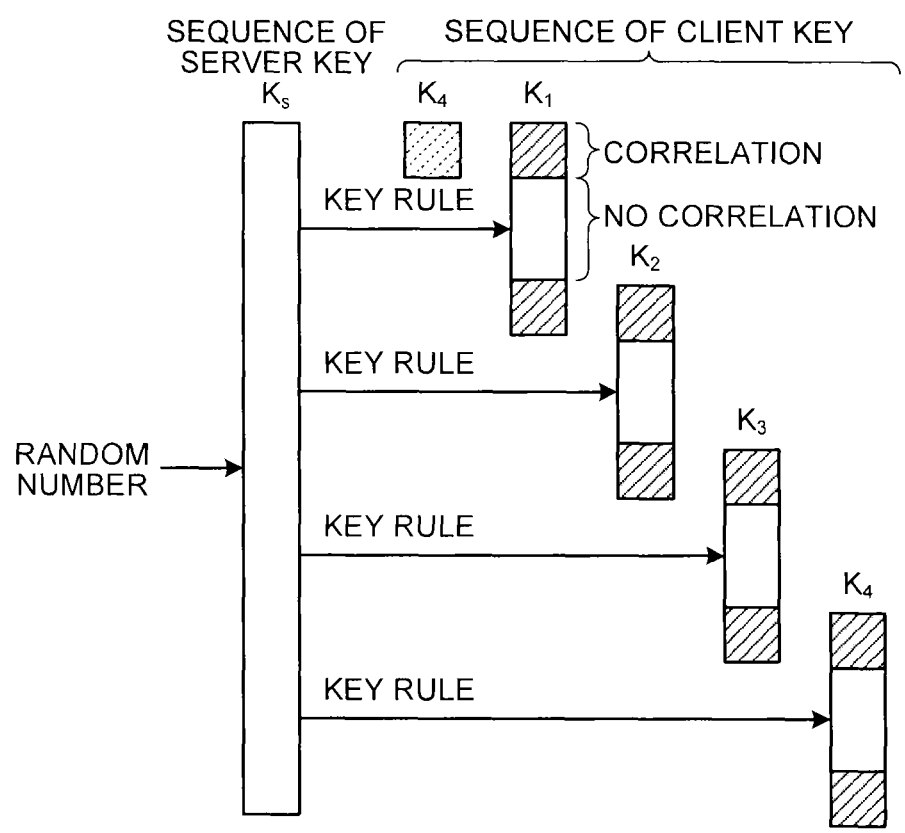
FIG. 2 is a schematic diagram of a relation between a server key and a plurality of client keys.

FIG. 2 is a schematic diagram of a relation between a server key $K_S$ and a plurality of client keys $K_i$.

The generating device 20 generates a plurality of client keys $K_i$ that are bit sequences partly correlated with one another on the basis of the client key rule for generating the client keys $K_i$. Bit sequences correlated with one another herein mean, as an example, a relation of those having completely the same bit pattern, or those not having completely the same bit pattern but resulting in the same bit pattern when a predetermined data conversion is applied (e.g., a bitwise NOT operation, a one-to-one function, or a linear transformation).

By allowing the n client keys $K_i$ to have such correlations, the encryption system 10 can generate some of the client keys $K_i$ by using the same partial sequence of the server key $K_S$. In this manner, the encryption system 10 can make the bit length of the server key $K_S$ shorter than the total bit length of the n client keys $K_i$. As a result, the encryption system 10 enables the server 40 to avoid storing all of the n client keys $K_i$ or storing a server key $K_S$ having the same bit length as the total bit length of the n client keys $K_i$. Therefore, the n client keys $K_i$ can be managed easily.

The sequence of one of the client keys $K_i$ may include a plurality of partial sequences having a correlation with two or more of the other client keys $K_i$. For example, the sequence of a first client key $K_1$ may include a partial sequence having a correlation with a second client key $K_2$ and another partial sequence having a correlation with a third client key $K_3$. In this manner, the generating device 20 can generate client keys $K_i$ allowing the key length of the server key $K_S$ to be reduced efficiently.

Furthermore, the sequence of one of the client keys $K_i$ may include a partial sequence having a correlation with some of the other client keys $K_i$ at the same time. For example, the sequence of the first client key $K_1$ may include a partial sequence having a correlation with both of the second client key $K_2$ and the third client key $K_3$. In this manner, the generating device 20 can generate client keys $K_i$ allowing the key length of the server key $K_S$ to be reduced efficiently.

Furthermore, the sequence of each of the client keys $K_i$ may include a partial sequence having no correlation with the other client keys $K_j$. In this manner, the generating device 20 can increase the security in the case of acquisition of any of the other client keys $K_i$ by an attacker.

In the sequence of one of the client key $K_i$, a longer partial sequence having no correlation with the other client keys $K_i$ can enhance the tolerance against attacks and thus increase the security in the case of acquisition of any of the other client keys $K_i$ by an attacker on one hand, but increase the bit length of the server key $K_S$ on the other. By contrast, in the sequence of one of the client keys $K_i$, a longer partial sequence having a correlation with any of the other client keys $K_i$ can decrease the bit length of the server key $K_S$ on one hand, but lower the tolerance against attacks and thus decrease the security in the case of acquisition of any of the other client keys $K_i$ by an attacker on the other.

Therefore, the encryption system 10 may adjust the level of correlation between each of the client keys $K_i$ and the other client keys $K_j$ (e.g., the ratio of sequences with and without a correlation, the number of other client keys $K_j$ having a correlation to the same sequence) depending on the environment in which the encryption system 10 is used, or the like. In this manner, the encryption system 10 can generate client keys $K_i$ at the security level required by a user.

Figure 3:
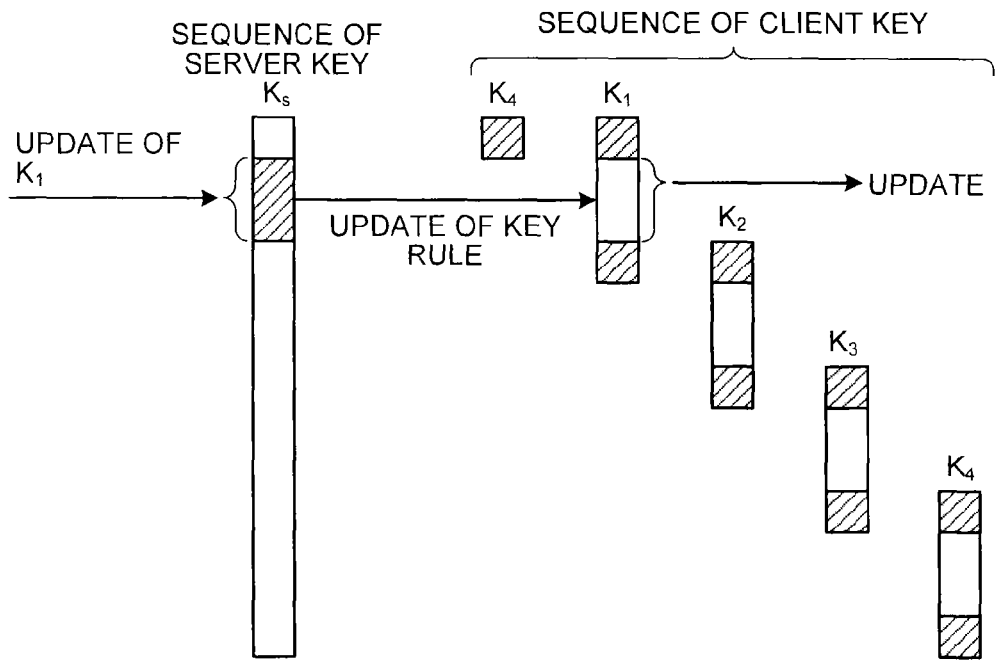
FIG. 3 is a schematic diagram of updated bit positions of client keys.
Figure 4:
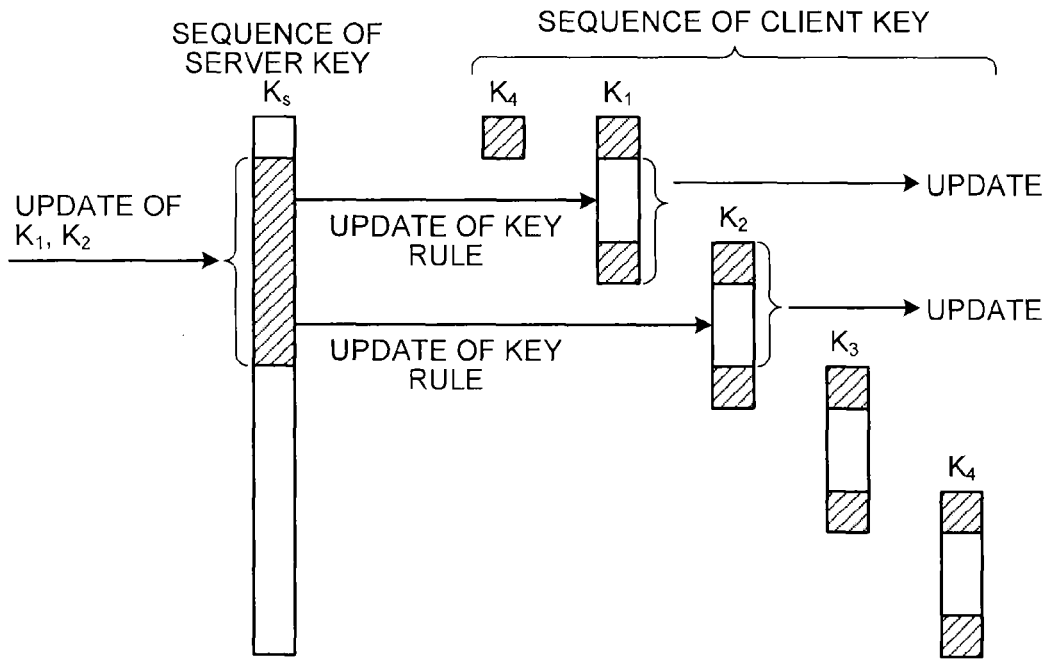
FIG. 4 is another schematic diagram of updated bit positions of client keys.

FIGS. 3 and 4 are schematic diagrams illustrating the server key $K_S$ and updated bit positions of the client keys $K_i$.

The generating device 20 can update some of the client keys $K_i$ after generating the server key $K_S$ and the client keys $K_i$. In this case, the generating device 20 updates partial sequences of the client keys $K_i$ to be updated having no correlation with the other client keys $K_i$ that are not to be updated.

The generating device 20 further updates part of the sequence of the server key $K_S$. Specifically, the generating device 20 updates part of the server key $K_S$ corresponding to the partial sequences of the client keys $K_i$ to be updated. In this case, the generating device 20 updates the server key $K_S$ so that the sequences of updated client keys $K_i$ are generated from the updated server key $K_S$ and the client key rule.

Alternatively, the generating device 20 may update part of the client key rule. For example, the generating device 20 updates a conversion function for converting a partial sequence of a client key $K_1$ to be updated into the client key $K_1$. Similarly, in this case, the generating device 20 updates the client key rule so that the sequences of updated client keys $K_i$ are generated from the updated server key $K_S$ and the client key rule.

Alternatively, the generating device 20 may update both of the server key $K_S$ and the client key rule.

For example, when one client key $K_1$ is to be updated and the other client keys $K_2$, $K_3$, and $K_4$ are not to be updated as illustrated in FIG. 3, the generating device 20 changes a partial sequence of the client key $K_1$ having no correlation with any of the other client keys $K_2$, $K_3$, and $K_4$. The generating device 20 also changes at least one of corresponding part of the sequence of the server key $K_S$ and corresponding part of the client key rule.

For another example, when two client keys $K_1$ and $K_2$ are to be updated and the other client keys $K_3$ and $K_4$ are not to be updated as illustrated in FIG. 4, the generating device 20 changes partial sequences of the client keys $K_1$ and $K_2$ having no correlation with any of the other client keys $K_3$ and $K_4$. In this case, the generating device 20 may also change sequences having a correlation only between the client key $K_1$ and the client key $K_2$. Similarly, in this case, the generating device 20 changes at least one of corresponding part of the sequence of the server key $K_S$ and corresponding part of the client key rule.

In this manner, the encryption system 10 can individually update some of the client keys $K_i$ even when the client keys $K_i$ have correlation among them. As a result, the encryption system 10 can efficiently update a plurality of client keys $K_i$.

Figure 5:
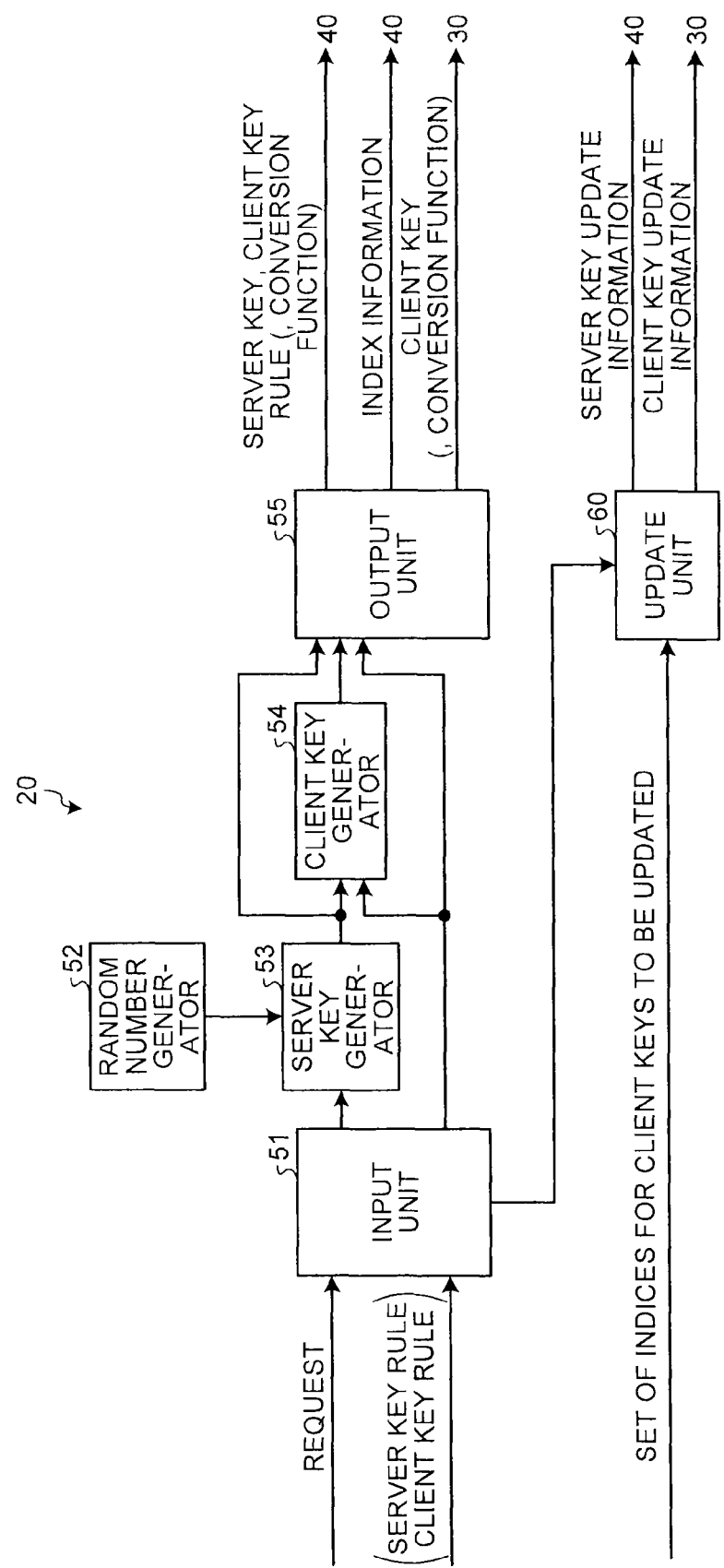
FIG. 5 is a schematic diagram of the configuration of a generating device.

FIG. 5 is a schematic diagram of the configuration of the generating device 20 according to the first embodiment. The generating device 20 includes an input unit 51, a random number generator 52, a server key generator (first key generator) 53, a client key generator (second key generator) 54, an output unit 55, and an update unit 60.

The input unit 51 receives an input of a key generation request entered by a user. The input unit 51 also receives a server key rule and a client key rule from an external information processing device or the like. Alternatively, the input unit 51 may acquire the internal server key rule and the client key rule that are privately stored, without receiving the server key rule and the client key rule from an external information processing device or the like. The input unit 51 passes the server key rule to the server key generator 53, and passes the client key rule to the client key generator 54 and to the output unit 55.

The random number generator 52 generates a random number, and passes the random number thus generated to the server key generator 53. The server key generator 53 generates a server key $K_S$ from the random number generated by the random number generator 52 on the basis of the server key rule received from the input unit 51. The server key generator 53 passes the server key $K_S$ thus generated to the client key generator 54 and to the output unit 55.

The client key generator 54 generates the n client keys $K_i$ from the server key $K_S$ received from the server key generator 53 and the client key rule received from the input unit 51. The client key generator 54 passes the n client keys $K_i$ thus generated to the output unit 55. When the client keys $K_i$ are seeds for generating the encryption keys $EK_i$, the client key generator 54 also generates n conversion functions $F\delta_i$ and passes the conversion functions $F\delta_i$ to the output unit 55.

The output unit 55 outputs the server key $K_S$ received from the server key generator 53 and the client key rule received from the input unit 51 to the server 40. The output unit 55 does not need to output the client key rule to the server 40 when the server 40 is capable of acquiring the client key rule from an external information processing device or the like.

The output unit 55 also outputs the n client keys $K_i$ received from the client key generator 54 to the respective client terminals 30. The output unit 55 also outputs index information indicating association between a client terminal 30 and the index i of the client key $K_i$ output to the client terminal 30 to the server 40. When the client keys $K_i$ are seeds for generating the encryption keys $EK_i$, the output unit 55 also outputs each of the n conversion functions $F\delta_i$ to the associated client terminal 30.

The update unit 60 inputs an update request from a user. The update unit 60 further inputs a set of indices i of the client keys $K_i$ to be updated. The update unit 60 receives the server key rule and the client key rule input by the input unit 51. The update unit 60 generates server key update information sri and client key update information cri on for updating the client keys $K_i$ to be updated on the basis of the server key rule and the client key rule. Note that the server key update information sri and the client key update information cri are generated on the basis of a random number, public information, a system management number, a key revision number, or the like.

The update unit 60 outputs the client key update information cri to the client terminals 30. The update unit 60 also outputs the server key update information sri to the server 40. Details of the configuration of the update unit 60 will be further described with reference to FIG. 13 and subsequent figures.

Figure 6:
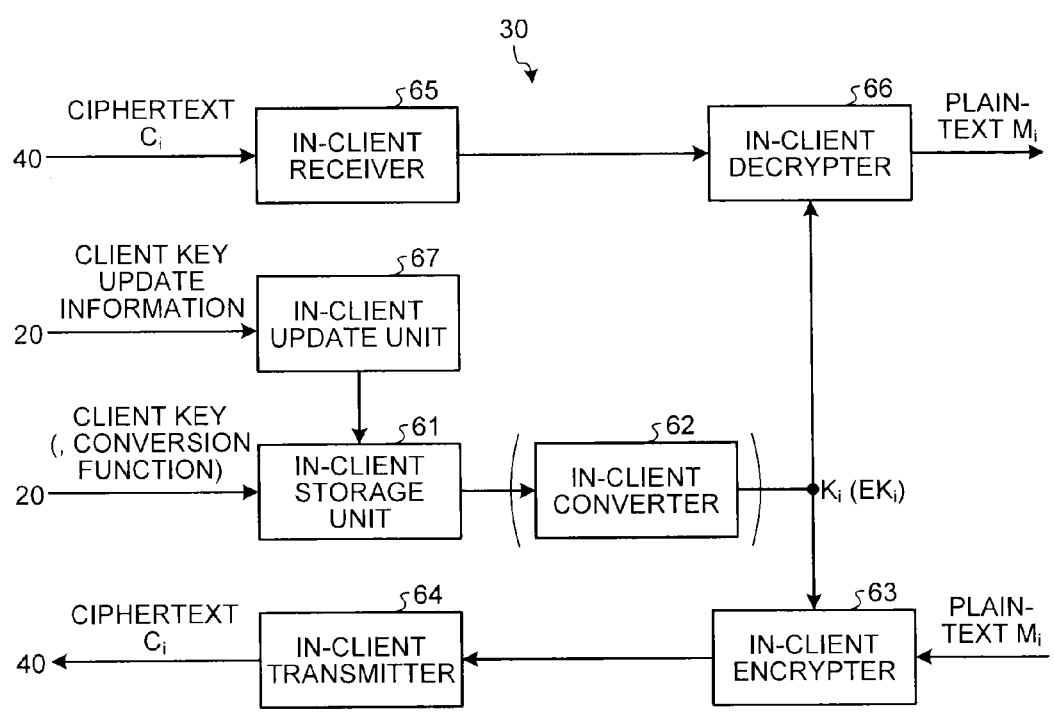
FIG. 6 is a schematic diagram of the configuration of a client terminal.

FIG. 6 is a schematic diagram of the configuration of a client terminal 30 according to the first embodiment. The client terminal 30 includes an in-client storage unit 61, an in-client converter 62, an in-client encrypter 63, an in-client transmitter 64, an in-client receiver 65, an in-client decrypter 66, and an in-client update unit 67.

The in-client storage unit 61 receives and stores the client key $K_i$ output from the generating device 20. When the client keys $K_i$ are seeds for generating the encryption keys $EK_i$, the in-client storage unit 61 also receives and stores the conversion function $F\delta_i$ output from the generating device 20.

When the client keys $K_i$ are seeds for generating the encryption keys $EK_i$, the in-client converter 62 converts the client key $K_i$ stored by the in-client storage unit 61 into an encryption key $EK_i$ on the basis of the conversion function $F\delta_i$. When the client key $K_i$ serves as an encryption key without any change, the client terminal 30 need not include the in-client converter 62.

When a ciphertext $C_i$ is to be transmitted to the server 40, the in-client encrypter 63 receives a plaintext $M_i$ from the client terminal itself, for example. The in-client encrypter 63 generates the ciphertext $C_i$ by encrypting the received plaintext $M_i$ by using the client key $K_i$ stored by the in-client storage unit 61 or the encryption key $EK_i$ resulting from conversion by the in-client converter 62. The in-client encrypter 63 then passes the ciphertext $C_i$ thus generated to the in-client transmitter 64. The in-client transmitter 64 then transmits the ciphertext $C_i$ received from the in-client encrypter 63 to the server 40.

When a ciphertext $C_i$ is to be received from the server 40, the in-client receiver 65 receives the ciphertext $C_i$ transmitted from the server 40, and passes the received ciphertext $C_i$ to the in-client decrypter 66. The in-client decrypter 66 then generates a plaintext $M_i$ by decrypting the ciphertext $C_i$ received from the in-client receiver 65 with the client key $K_i$ stored by the in-client storage unit 61 or the encryption key $EK_i$ resulting from conversion by the in-client converter 62. The in-client decrypter 66 then outputs the plaintext $M_i$ thus generated to the client terminal itself, for example. When the encryption and decryption are executed by the same process, the in-client encrypter 63 and the in-client decrypter 66 may be realized as one module, for example.

The in-client update unit 67 receives the client key update information cri output from the generating device 20. The in-client update unit 67 updates the client key $K_i$ or the conversion function $F\delta_i$ stored by the in-client storage unit 61 according to the received client key update information cri.

The in-client converter 62 may convert the client key $K_i$ into the encryption key $EK_i$ when the client key $K_i$ and the conversion function $F\delta_i$ is first received from the generating device 20 or updated by the generating device 20, instead of converting the client key $K_i$ into the encryption key $EK_i$ each time a ciphertext $C_i$ is transmitted and received. In this case, the in-client storage unit 61 stores the encryption key $EK_i$ resulting from conversion by the in-client converter 62. The in-client encrypter 63 and the in-client decrypter 66 then acquires the encryption key $EK_i$ from the in-client storage unit 61 each time a ciphertext $C_i$ is transmitted and received.

Figure 7:
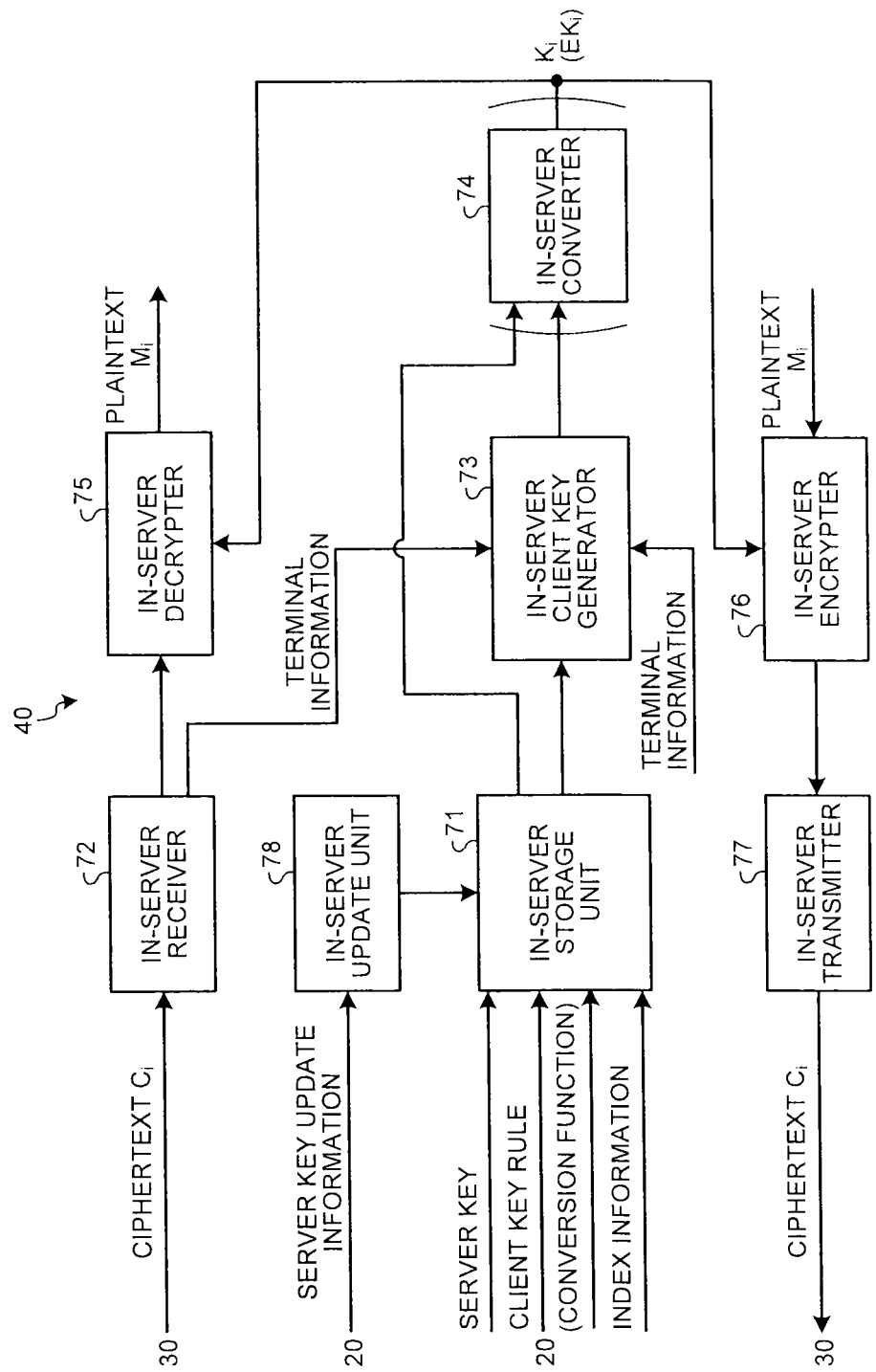
FIG. 7 is a schematic diagram of the configuration of a server.

FIG. 7 is a schematic diagram of the configuration of the server 40 according to the first embodiment. The server 40 includes an in-server storage unit 71, an in-server receiver 72, an in-server client key generator 73, an in-server converter 74, an in-server decrypter 75, an in-server encrypter 76, an in-server transmitter 77, and an in-server update unit 78.

The in-server storage unit 71 receives and stores the server key $K_S$ and the client key rule from the generating device 20. When a public client key rule is used, the in-server storage unit 71 receives the client key rule from the source information processing device. The in-server storage unit 71 also receives and stores the index information indicating a relation between each of the client terminals 30 and the index i of the client key $K_i$ from the generating device 20. When the client keys $K_i$ are seeds for generating the encryption keys $EK_i$, the in-server storage unit 71 also receives and stores n conversion functions $F\delta_i$ output from the generating device 20.

The in-server receiver 72 receives the ciphertext $C_i$ transmitted by the client terminal 30, and passes the received ciphertext $C_i$ to the in-server decrypter 75. The in-server receiver 72 also passes the terminal information identifying the client terminal 30 having transmitted the ciphertext $C_i$ to the in-server client key generator 73.

When the ciphertext $C_i$ is received, the in-server client key generator 73 identifies the index i of the client key $K_i$ used in generating the ciphertext $C_i$, on the basis of the terminal information received from in-server receiver 72 and the index information stored by the in-server storage unit 71. Once the index i is identified, the in-server client key generator 73 generates the client key $K_i$ associated with the index i from the server key $K_S$ stored by the in-server storage unit 71 on the basis of the client key rule also stored by the in-server storage unit 71.

When the client keys $K_i$ are seeds for generating the encryption keys $EK_i$, the in-server converter 74 receives the client key $K_i$ generated by the in-server client key generator 73. The in-server converter 74 converts the received client key $K_i$ into the encryption key $EK_i$ on the basis of the associated conversion function $F\delta_i$ stored by the in-server storage unit 71. When the client key $K_i$ serves as an encryption key without any change, the server 40 need not include the in-server converter 74. Alternatively, the server 40 may include a block combining the in-server client key generator 73 and the in-server converter 74. In this case, the combination block executes a combined function combining the client key rule and the conversion function to directly generate an encryption key $EK_i$ from an index i.

The in-server decrypter 75 generates a plaintext $M_i$ by decrypting the ciphertext $C_i$ received from the in-server receiver 72 by using the client key $K_i$ generated by the in-server client key generator 73 or the encryption key $EK_i$ resulting from conversion by the in-server converter 74. The in-server decrypter 75 then outputs the plaintext $M_i$ thus generated.

When a ciphertext $C_i$ is to be transmitted, the in-server client key generator 73 acquires the terminal information identifying the destination client terminal 30 to which the ciphertext is to be transmitted. The in-server client key generator 73 identifies the index i of the client key $K_i$ stored on the destination client terminal 30 on the basis of the received terminal information and the index information stored by the in-server storage unit 71. Once the index i is identified, the in-server client key generator 73 generates the client key $K_i$ associated with the index i from the server key $K_S$ stored by the in-server storage unit 71 on the basis of the client key rule also stored by the in-server storage unit 71.

When the client keys $K_i$ are seeds for generating the encryption keys $EK_i$, the in-server converter 74 receives the client key $K_i$ generated by the in-server client key generator 73. The in-server converter 74 converts the received client key $K_i$ into the encryption key $EK_i$ on the basis of the associated conversion function $F\delta_i$ stored by the in-server storage unit 71.

The in-server encrypter 76 receives a plaintext $M_i$ from the external. The in-server encrypter 76 generates the ciphertext $C_i$ by encrypting the plaintext $M_i$ thus received with the client key $K_i$ received from the in-server client key generator 73 or the encryption key $EK_i$ resulting from conversion by the in-server converter 74. The in-server encrypter 76 then passes the ciphertext $C_i$ thus generated to the in-server transmitter 77. The in-server transmitter 77 then transmits the ciphertext $C_i$ received from the in-server encrypter 76 to the destination client terminal 30. When the encryption and decryption are executed by the same process, the in-server decrypter 75 and the in-server encrypter 76 may be realized as one module, for example.

Figure 8:
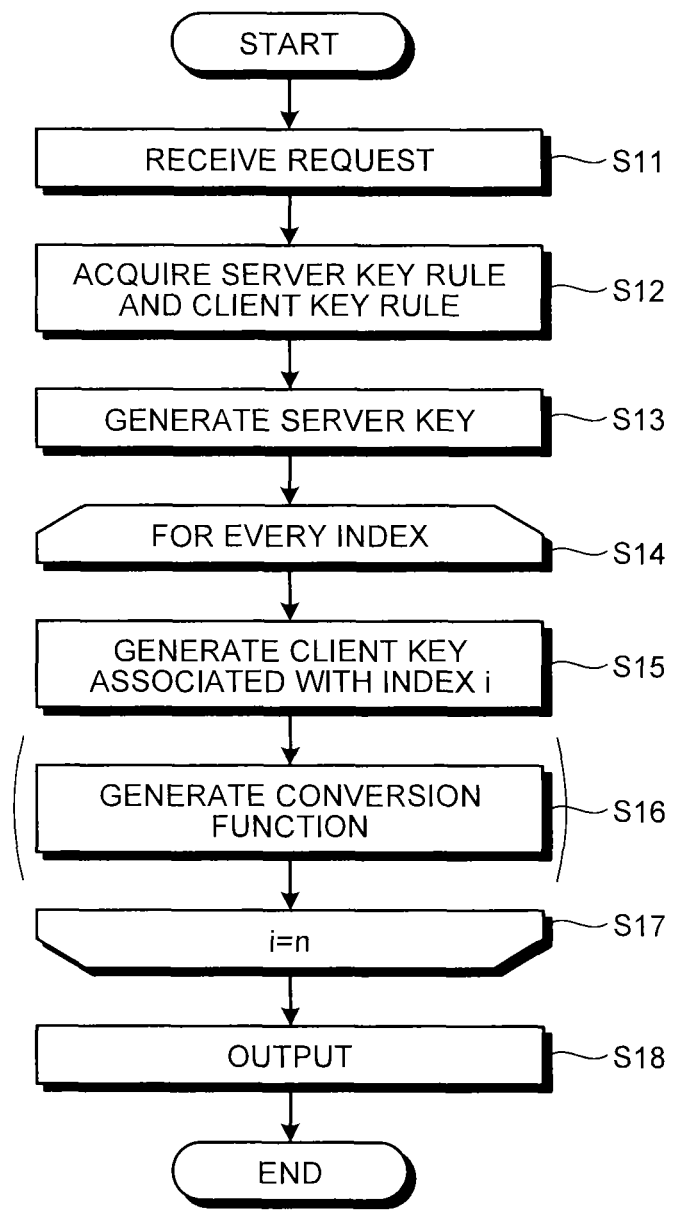
FIG. 8 is a flowchart of a process performed by the generating device.

FIG. 8 is a flowchart of a process performed by the generating device 20 according to the first embodiment. To begin with, at Step S11, the input unit 51 in the generating device 20 receives a key generation request. Subsequently, at Step S12, the input unit 51 acquires a server key rule and a client key rule. At Step S12, the input unit 51 may also acquire a conversion function $F\delta_i$ for converting a bit sequence of a client key $K_i$ into a bit sequence of an encryption key $EK_i$.

Subsequently, at Step S13, the server key generator 53 in the generating device 20 executes the server key rule to generate a server key $K_S$ based on a random number. In this example, the server key rule is a server key function that receives an input of a random number r and outputs a bit sequence of a server key $K_S$, as indicated in Expression (1) below. The server key function indicated in Expression (1) will be described later in detail with reference to FIG. 9.

$$\text{SKeyGen}(r) \rightarrow K_s \quad (1)$$

The client key generator 54 in the generating device 20 then executes a loop process from Step S14 to Step S17 for each of the indices i. In this example, the client key generator 54 executes the process at Step S15 and Step S16 while incrementing i from i=1 to i=n.

At Step S15, the client key generator 54 generates a client key $K_i$ associated with the index i by executing the client key rule on the basis of the server key $K_S$. In this example, the client key rule is a client key function that receives an input of the server key $K_S$ and the index i, and outputs a bit sequence of the client key $K_i$, as indicated by Expression (2) below. The client key function indicated in Expression (2) will be described later in detail with reference to FIG. 10.

$$\text{CKeyGen}(K_s, i) \rightarrow K_i \quad (2)$$

Subsequently, at Step S16, the client key generator 54 generates a conversion function $F\delta_i$ for converting the bit sequence of the client key $K_i$ into the encryption key $EK_i$. The client key generator 54 executes Step S16 when the client key $K_i$ is a seed for generating the encryption key $EK_i$, but does not execute Step S16 when the bit sequence of the client key $K_i$ serves as the encryption key without any change. The client key generator 54 does not execute Step S16, either, when the conversion function $F\delta_i$ is already acquired at Step S12.

When i=n at Step S17, the client key generator 54 exits the loop process, and moves the process to Step S18. At Step S18, the output unit 55 in the generating device 20 outputs the server key $K_S$ and the client key rule to the server 40. When the server 40 can acquire the client key rule from the external, the output unit 55 does not need to output the client key rule to the server 40. When the client keys $K_i$ are seeds for generating the encryption keys $EK_i$, the output unit 55 also outputs n conversion functions $F\delta_i$ to the server 40.

The output unit 55 then outputs each of the n client keys $K_i$ to the associated client terminal 30. When the client keys $K_i$ are seeds for generating the encryption keys $EK_i$, the output unit 55 also outputs each of the n conversion functions $F\delta_i$ to the associated client terminal 30. Once the process at Step S18 is completed, the generating device 20 ends the process.

Figure 9:
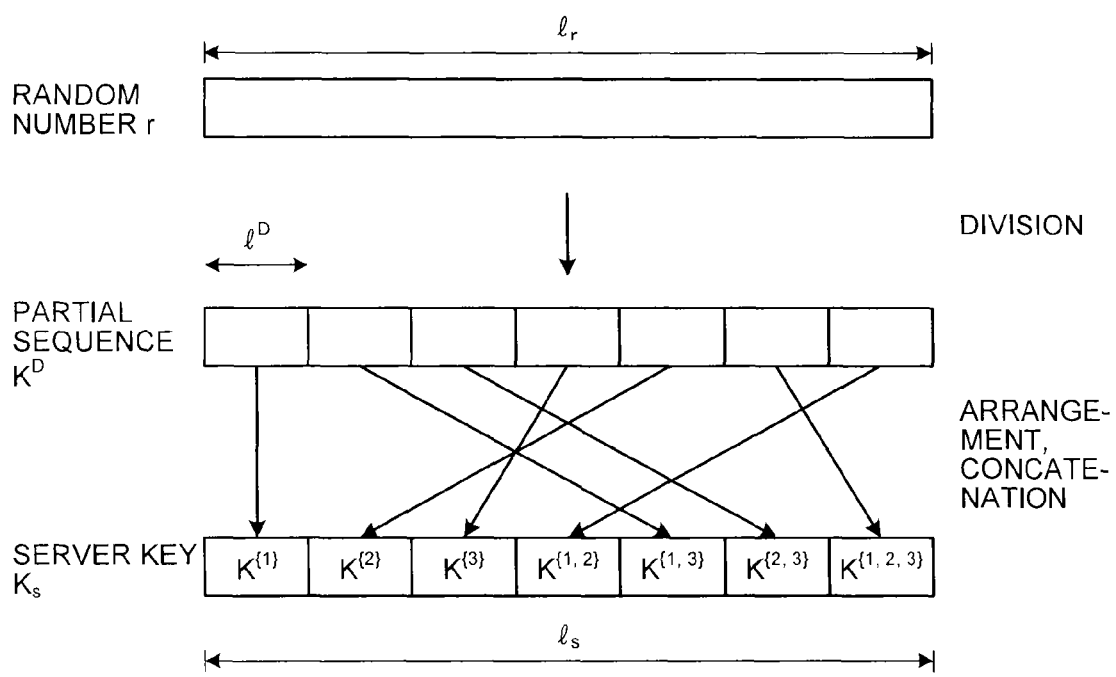
FIG. 9 is a schematic diagram of details of a server key function.

FIG. 9 is a schematic diagram of an example of details of the server key function (SKeyGen(r)). The server key function receives an input of a random number r.

The server key function divides the received random number r into a plurality of partial sequences. The server key function also associates multiple sets D with the partial sequences, respectively.

Each of the sets D is a set having indices as its elements, and represents every combination of the indices from 1 to n. For example, when n=3 (in other words, when i=1, 2, 3), sets D={1}, {2}, {3}, {1, 2}, {1, 3}, {2, 3}, and {1, 2, 3}. {x, y, z} represents a set of a combination of x, y, and z.

A partial sequence associated with a set D is represented by $K^D$. The random number r can thus be expressed by following Expression (3), as an example. Here, ∥ is an operator for concatenating the bit sequences adjacent thereto. A partial sequence $K^D$ indicates that the partial sequence is information to be used in generating client keys $K_i$ corresponding to the elements of the set D. For example, $K^{\{1,2\}}$ is information used in generating client keys $K_1$ and $K_2$.

$$K^{\{1\}} \| K^{\{2\}} \| \ldots \| K^{\{1,2\}} \| K^{\{1,3\}} \| \ldots \| K^{\{1,2,3\}} \| \ldots \| K^{\{1,2,\ldots,n\}} = r \quad (3)$$

The bit length of each of the partial sequences is determined by the server key function. The bit length of a partial sequence $K^D$ is represented by $l^D$. $l^D$ is an integer equal to or larger than zero.

The server key function arranges and concatenates a plurality of partial sequences $K^D$ into a row. As an example, the server key function positions the partial sequences associated with sets D having smaller numbers of indices (elements) on the left. When the numbers of indices (elements) are the same, a partial sequence with a set D including an index (element) of a smaller value is positioned on the left.

As an example, when $K^{\{1\}}$ and $K^{\{2,3\}}$ are given, the server key function positions $K^{\{1\}}$, which has a smaller number of indices (elements), on the left. As another example, when $K^{\{1,2\}}$ and $K^{\{2,3\}}$ are given, the server key function positions $K^{\{1,2\}}$ having indices (elements) of smaller values on the left. As still another example, when $K^{\{1,2\}}$ and $K^{\{1,3\}}$ are given, the server key function positions $K^{\{1,2\}}$ having indices (elements) of smaller values on the left.

The server key function then concatenates the partial sequences thus arranged, and outputs a server key $K_S$, as indicated in Expression (4) below. Illustrated in FIG. 9 is an exemplary arrangement for a case in which n=3.

$$K_s = K^{\{1\}} \| K^{\{2\}} \| \ldots \| K^{\{1,2\}} \| K^{\{1,3\}} \| \ldots \| K^{\{1,2,3\}} \| \ldots \| K^{\{1,2,\ldots,n\}} \quad (4)$$

Such a server key function can generate an $l_S$-bit server key $K_S$ from an $l_r$-bit random number, where $l_r=l_S$, for example. The partial sequences may be arranged in any predetermined way.

Figure 10:
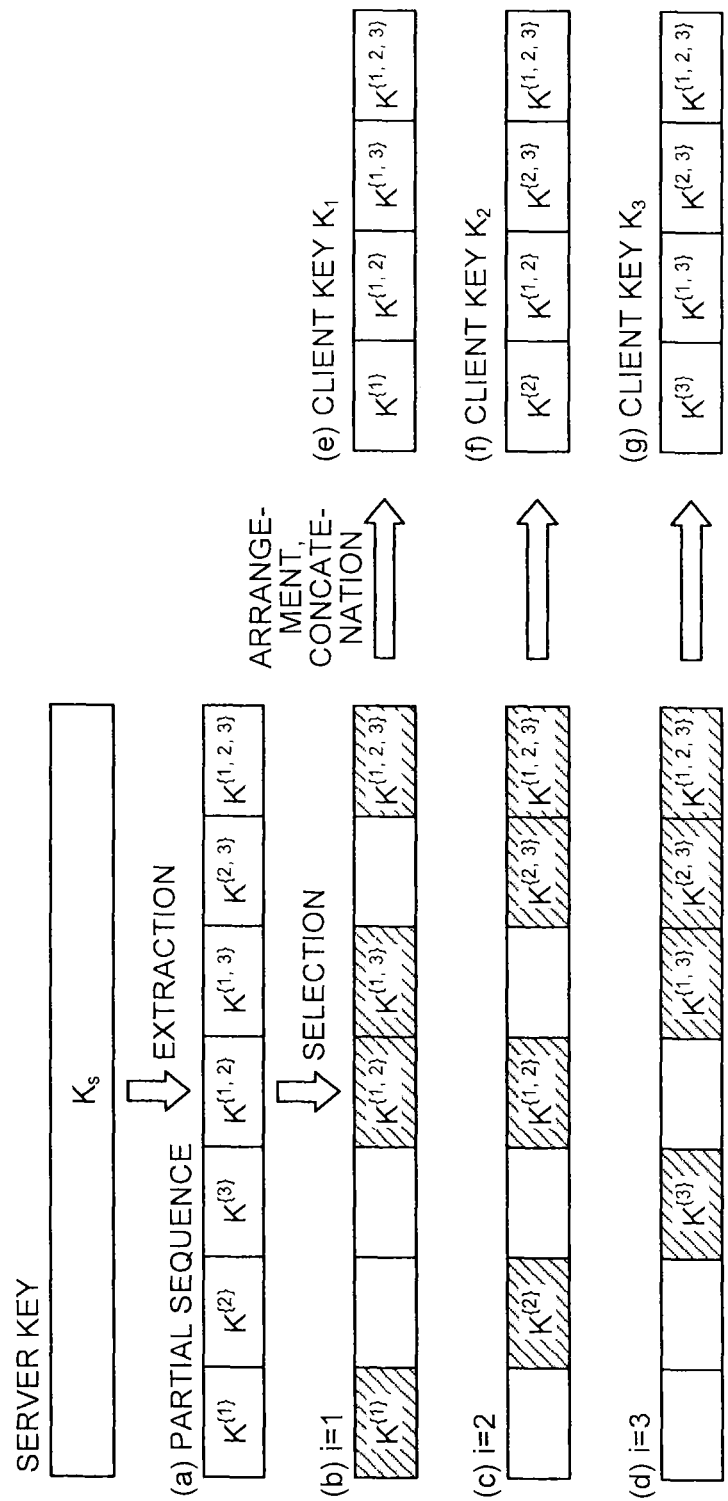
FIG. 10 is a schematic diagram of details of a client key function.

FIG. 10 is a schematic diagram of an example of details of a client key function (CKeyGen($K_S$, i)). The client key function receives inputs of the server key $K_S$ and a value of the index i.

The client key function extracts a plurality of partial sequences $K^D$ from the server key $K_S$ thus received. In other words, the client key function extracts the partial sequences in the manner indicated by Expression (5) below. In FIG. 10, (a) indicates the partial sequences extracted when n=3.

$$K^{\{1\}}, K^{\{2\}}, \ldots K^{\{1,2\}}, K^{\{1,3\}}, \ldots K^{\{1,2,3\}}, \ldots K^{\{1,2,\ldots,n\}} \quad (5)$$

The client key function then selects two or more partial sequences associated with the sets including the index value thus received as its element from the partial sequences thus extracted. For example, when i=1, the client key function selects partial sequences indicated by Expression (6) below. In FIG. 10, (b) indicates partial sequences selected when n=3, i=1.

$$K^{\{1\}}, K^{\{1,2\}}, K^{\{1,3\}}, \ldots K^{\{1,2,3\}}, \ldots K^{\{1,2,\ldots,n\}} \quad (6)$$

As another example, when i=2, the client key function selects the partial sequences indicated by Expression (7) below. In FIG. 10, (c) indicates the partial sequence selected when n=3, i=2.

$$K^{\{2\}}, K^{\{1,2\}}, K^{\{2,3\}}, \ldots K^{\{1,2,3\}}, \ldots K^{\{1,2,\ldots,n\}} \quad (7)$$

As still another example, the client key function selects the partial sequences indicated by Expression (8) below when i=n. In FIG. 10, (d) indicates the partial sequence selected when n=3, i=3.

$$K^{\{n\}}, K^{\{1,n\}}, K^{\{2,n\}}, \ldots K^{\{1,2,n\}}, \ldots K^{\{1,2,\ldots,n\}} \quad (8)$$

The client key function then arranges and concatenates the two or more partial sequences $K^D$ thus selected into a row. As an example, the client key function positions the partial sequences associated with sets D having smaller numbers of indices (elements) on the left. When the numbers of indices (elements) are the same, a partial sequence with a set D including an element of a smaller value is positioned on the left. The way at which the partial sequences are arranged is the same as that accomplished by the server key function.

The client key function then concatenates the partial sequences thus arranged, and outputs the client key $K_i$. For example, when i=1, the client key function outputs the client key $K_1$ indicated by Expression (9) below. In FIG. 10, (e) indicates a client key $K_1$ output when n=3, i=1.

$$K_1 = K^{\{1\}} \| K^{\{1,2\}} \| K^{\{1,3\}} \| \ldots \| K^{\{1,2,3\}} \| \ldots \| K^{\{1,2,\ldots,n\}} \quad (9)$$

As another example, when i=2, the client key function outputs the client key $K_2$ indicated by Expression (10) below. In FIG. 10, (f) indicates the client key $K_2$ output when n=3, i=2.

$$K_2 = K^{\{2\}} \| K^{\{1,2\}} \| K^{\{2,3\}} \| \ldots \| K^{\{1,2,3\}} \| \ldots \| K^{\{1,2,\ldots,n\}} \quad (10)$$

As still another example, when i=n, the client key function outputs a client key $K_n$ as indicated by Expression (11) below. In FIG. 10, (g) indicates a client key $K_3$ output when n=3, i=3.

$$K_n = K^{\{n\}} \| K^{\{1,n\}} \| K^{\{2,n\}} \| \ldots \| K^{\{1,2,n\}} \| \ldots \| K^{\{1,2,\ldots,n\}} \quad (11)$$

The partial sequences may be arranged in any predetermined way.

In the client key $K_i$ thus generated, a partial sequence associated with a set D of two or more indices (elements) has a correlation with the other client keys $K_j$. In this manner, the generating device 20 according to the first embodiment can keep the total bit length of the n client keys $K_i$ shorter than the bit length $l_s$ of the server key $K_S$ by using such a client key function as a client key rule.

Figure 11:
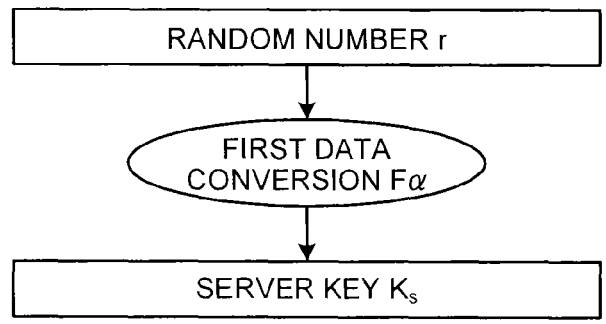
FIG. 11 is a schematic diagram expressing details of the server key function by a function.

FIG. 11 is a schematic diagram expressing details of the server key function by a function. The server key function is not limited to the function described with reference to FIG. 9 but may be a function that generates a server key $K_S$ by performing data conversion (first data conversion Fα) on a random number r.

For example, the first data conversion Fα may be a function that outputs a random number r without any change as the server key $K_S$, as indicated by Expression (21) below.

$$K_s = r \quad (21)$$

As another example, the first data conversion Fα may output a sequence resulting from converting the random number r with a function $F_1$, as indicated by Expression (22) below. As an example, $F_1$ is a one-to-one function, a pseudo-random function, or a hash function. $F_1$ outputs $l_S$ bits ($l_r \geq l_S$) for an input of $l_r$ bits.

$$K_s = F_1(r) \quad (22)$$

As still another example, the first data conversion Fα may output a result of an exclusive OR performed on the random number r and a sequence resulting from converting the random number r with a function $F_2$, as indicated by Expression (23) below. As an example, $F_2$ is a one-to-one function, a pseudo-random function, a hash function, or a constant function. $F_2$ outputs $l_S$ bits for an input of $l_S$ bits.

$$K_s = r \oplus F_2(r) \quad (23)$$

As another example, the first data conversion Fα may output a result of an exclusive OR performed on a sequence resulting from converting the random number r with a function $F_1$ and a sequence resulting from converting the random number r with a function $F_3$, as indicated by Expression (24) below. As an example, $F_3$ is a one-to-one function, a pseudo-random function, a hash function, or a constant function. $F_3$ outputs $l_S$ bits ($l_r \geq l_S$) for an input of $l_r$ bits.

$$K_s = F_1(r) \oplus F_3(r) \quad (24)$$

Figure 12:
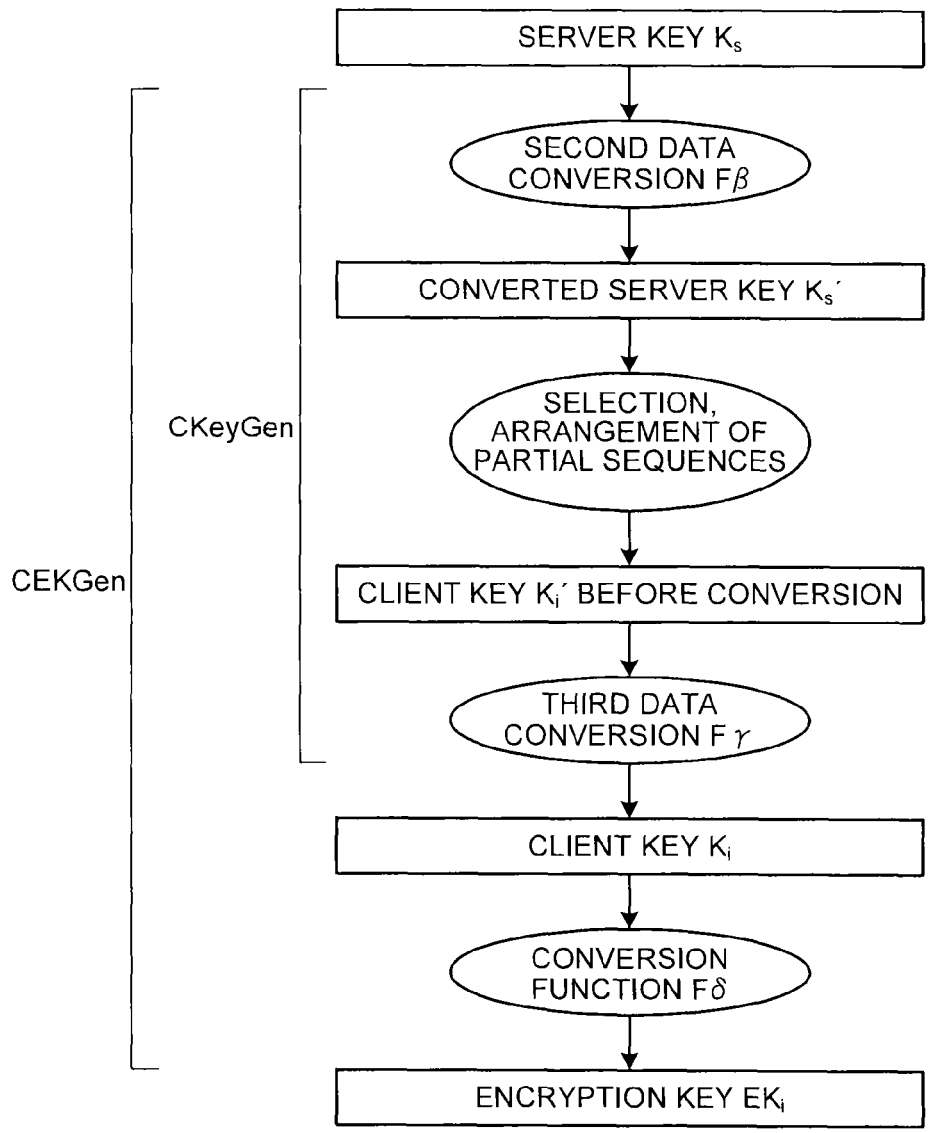
FIG. 12 is a schematic diagram expressing details of the client key function by functions.

FIG. 12 is a schematic diagram expressing details of the server key function by functions. The client key function may also be a function that applies data conversion (second data conversion Fβ) to the sequence of the server key $K_S$, and generates a plurality of client keys $K_i$ from the sequence of a server key $K_S'$ resulting from the conversion.

For example, the second data conversion Fβ may be a function that outputs the server key $K_S$ without any change as the converted server key $K_S'$, as indicated by Expression (31) below.

$$K_s' = K_s \quad (31)$$

As another example, the second data conversion Fβ may also output a sequence resulting from converting the server key $K_S$ with a function $F_4$, as the converted server key $K_S'$, as indicated by Expression (32) below. As an example, $F_4$ is a one-to-one function, a pseudo-random function, or a hash function. $F_4$ outputs $l_S$ bits for an input of $l_S$ bits.

$$K_s' = F_4(K_s) \quad (32)$$

As another example, the second data conversion Fβ may output a result of an exclusive OR performed on the server key $K_S$ and a sequence resulting from converting the server key $K_S$ with a function $F_5$ as the converted server key $K_S'$, as indicated by Expression (33) below. As an example, $F_5$ is a one-to-one function, a pseudo-random function, a hash function, or a constant function. $F_5$ outputs $l_S$ bits for an input of $l_S$ bits.

$$K_s'=K_s \oplus F_5(K_s) \tag{33}$$

As another example, the second data conversion Fβ may output a result of an exclusive OR performed on a sequence resulting from converting the server key $K_S$ with a function $F_4$ and another sequence resulting from converting the server key $K_S$ with a function $F_5$ as the converted server key $K_S'$, as indicated by Expression (34) below.

$$K_s'=F_4(K_s) \oplus F_5(K_s) \tag{34}$$

The client key function may also be a function that generates a client key $K_i$ by applying a data conversion (third data conversion Fγ) to a sequence obtained by arranging the partial sequences $K^D$ selected from the sequence of the converted server key $K_S'$ into a row (client key $K_i'$ before conversion).

For example, the third data conversion Fγ may be a function that outputs the client key $K_i'$ before conversion without any change as the client key $K_i$, as indicated by Expression (41) below.

$$K_i=K_i' \tag{41}$$

As another example, the third data conversion Fγ may output a sequence resulting from converting the client key $K_i'$ before conversion with a function $F_6$ as the client key $K_i$, as indicated by Expression (42) below. As an example, $F_6$ is a one-to-one function, a pseudo-random function, or a hash function. $F_6$ outputs $l_i$ bits for an input of $l_i$ bits.

$$K_i=F_6(K_i') \tag{42}$$

$F_6$ may also assume $K_i'$ as a row vector, and multiply $K_i'$ by an invertible matrix R from the right, as indicated by Expression (43) below. For example, $F_6$ performs the calculation assuming one bit of $K_i'$ as an element of a vector and R as an invertible matrix $l_i \times l_i$. As another example, a number represented by a plurality of bits in $K_i'$ may be assumed as an element of a vector. R may be handled as public information. By multiplying the client key $K_i'$ before conversion by the invertible matrix R, the positions of bits in a common partial sequence can be changed among the client keys $K_i$ including a common partial sequence. In this manner, even when an attacker acquires the client key $K_i$, it is impossible for the attacker to guess the position of the bits included in the common partial sequence in the bit sequence of a client key $K_j$ sharing the common partial sequence with the client key $K_i$.

$$F_6(K_i')=K_i' \times R \tag{43}$$

As another example, the third data conversion Fγ may output a result of an exclusive OR performed on the client key $K_i'$ before conversion and a sequence resulting from converting the client key $K_i'$ before conversion with a function $F_7$ as the client key $K_i$, as indicated by Expression (44) below. As an example, $F_7$ is a one-to-one function, a pseudo-random function, a hash function, or a constant function. $F_7$ outputs $l_i$ bits for an input of $l_i$ bits.

$$K_i=K_i' \oplus F_7(K_i') \tag{44}$$

As another example, the third data conversion Fγ also output a result of an exclusive OR performed on a sequence resulting from converting the client key $K_i'$ before conversion with the function $F_6$ and a sequence resulting from converting the client key $K_i'$ before conversion with the function $F_7$ as the client key $K_i$, as indicated by Expression (45) below.

$$K_i=F_6(K_i') \oplus F_7(K_i') \tag{45}$$

As another example, the third data conversion Fγ may also output a sequence resulting from converting the client key $K_i'$ before conversion and the set D with a function $F_8$ as the client key $K_i$, as indicated by Expression (46) below. $F_8$ deletes a partial sequence $K^D$ corresponding to the set D from $K_i'$.

$$K_i=F_8(K_i',D) \tag{46}$$

As another example, the third data conversion Fγ may also output a plurality of sequences resulting from converting the client key $K_i'$ before conversion with a function $F_9$ as a plurality of client keys $K_i$, $K_j$, as indicated by Expression (47) below. $K_j$ represents a client key that is different from $K_i$. As an example, $F_9$ is a one-to-one function, a pseudo-random function, or a hash function.

$$k_i \| k_j = F_9(K_i',K_j') \tag{47}$$

$F_9$ may also assume a plurality of client keys $K_i'$ as one row vector, and multiply $K_i'$ by an invertible matrix R from the right, as indicated by Expression (48) below. Expressions (47) and (48) represent an example in which there are two client keys $K_i'$ before conversion, but there may be three or more client keys $K_i'$ before conversion.

$$F_9(K_i',K_j')=[K_i',K_j'] \times R \tag{48}$$

Furthermore, the client key function CKeyGen(r) may be a function for collectively executing the second data conversion Fβ, the selection of partial sequences, the arrangement, and the third data conversion Fγ.

Furthermore, the generating device 20 may generate a combined function CEKGen($K_S$, i) obtained by combining the client key function CKeyGen($K_S$, i) and the conversion function Fδ$_i$. In this case, the generating device 20 transmits the generated combined function CEKGen($K_S$, i) to the server 40 to allow the server 40 to directly generate the encryption key EK$_i$ from the server key $K_S$ and an index i.

Figure 13:
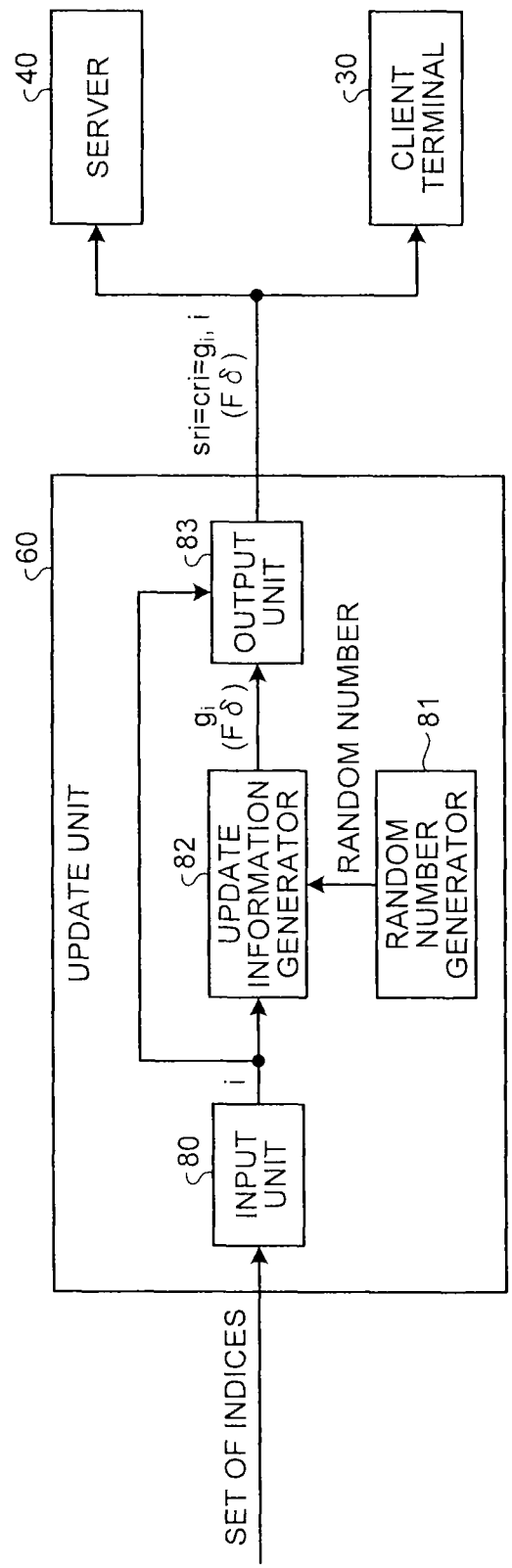
FIG. 13 is a schematic diagram of the configuration of an update unit according to a first example.

FIG. 13 is a schematic diagram of the configuration of the update unit 60 with a client terminal 30 and the server 40 according to a first example.

In the first example, the client key $K_i$ is seed information for generating an encryption key EK$_i$. Thus, in the first example, the generating device 20 generates a conversion function Fδ$_i$ for converting each of the client keys $K_i$ into an encryption key EK$_i$. In the first example, the generating device 20 outputs an associated conversion function Fδ$_i$ to each of the client terminals 30. In the first example, the update unit 60 updates the conversion functions Fδ$_i$.

In the first example, the update unit 60 includes an input unit 80, a random number generator 81, an update information generator 82, and an output unit 83 as illustrated in FIG. 13.

The input unit 80 receives as input a set of indices i for specifying the client keys $K_i$ to be updated. The set of indices i may contain only one index i or may contain a plurality of indices i. The random number generator 81 generates a random number of a predetermined number of digits.

The update information generator 82 generates a master key g$_i$ associated with each of the indices i input by the input unit 80 on the basis of the random number generated by the random number generator 81. The master key $g_i$ is information that is a seed for generating a conversion function $F\delta_i$ associated with an index i.

The output unit 83 outputs the index i and the master key $g_i$ as server key update information sri to the server 40. The output unit 83 also outputs, for each of the client terminals 30 storing the client keys $K_i$ to be updated, an associated index i and the master key $g_i$ as client key update information cri.

Alternatively, the update information generator 82 may generate a conversion function $F\delta_i$ associated with an index i instead of the master key $g_i$. In this case, the output unit 83 outputs the associated conversion function $F\delta_i$ as the server key update information sri to the server 40 instead of the master key $g_i$. Furthermore, in this case, the output unit 83 outputs the associated conversion function $F\delta_i$ as the client key update information cri to the client terminal 30 instead of the master key $g_i$.

Examples of the conversion functions $F\delta_i$ include the following. The update information generator 82 may generate the conversion functions $F\delta_i$ on the basis of information such as a system management number and a revision number in addition to the master key $g_i$. Here, information other than the master key $g_i$ will be referred to as management information w. The management information w may be either secret information or public information.

For example, the conversion function $F\delta_i$ may be a function that outputs an arithmetic sum, an arithmetic product, or an exclusive OR of the client key $K_i$ and the master key $g_i$ as indicated by Expressions (60) to (62) below. Expression (62) is an expression when $K_i$ and $g_i$ have the same bit length.

$$F\delta_i(K_i)=K_i+g_i \qquad (60)$$

$$F\delta_i(K_i)=K_i\times g_i \qquad (61)$$

$$F\delta_i(K_i)=K_i\oplus g_i \qquad (62)$$

For another example, the conversion function $F\delta_i$ may be a function that outputs a result of operation on the client key $K_i$, the master key $g_i$, and the management information w as indicated by Expression (63) below. Here, symbol ○ represents an operator such as arithmetic addition, arithmetic multiplication, or exclusive OR operation, which also applies to other Expressions.

$$F\delta_i(K_i)=K_i\circ g_i\circ w \qquad (63)$$

For another example, the conversion function $F\delta_i$ may be a function that outputs a sequence obtained by converting the sum, the product, or the exclusive OR of the client key the master key $g_i$, and the management information w with a $K_i$, function $F_{10}$ as indicated by Expression (64) below. As an example, $F_{10}$ is a one-to-one function, a pseudo-random function, or a hash function. $F_{10}$ outputs $l_i$ bits for an input of $l_i$ bits.

$$F\delta_i(K_i)=F_{10}(K_i\circ g_i\circ w) \qquad (64)$$

For another example, the conversion function $F\delta_i$ may assume $K_i$ as a row vector and multiply $K_i$ by an invertible matrix $g_i$ from the right as indicated by Expression (65) below. For example, the conversion function $F\delta_z$ performs the calculation assuming one bit of $K_i$ as an element of a vector and a row vector of $1\times l_i$, and $g_i$ as an invertible matrix $l_i\times l_i$. Alternatively, for example, the conversion function $F\delta_z$ may perform calculation assuming that a number represented by a plurality of bits in $K_i$ as an element of a vector.

$$F\delta_i(K_i)=K_i\times g_i \qquad (65)$$

For another example, the conversion function $F\delta_i$ may assume $K_i$ as a column vector and add the product of a matrix w and the column vector $g_i$ as indicated by Expression (66) below. For example, the conversion function $F\delta_z$ performs the calculation assuming one bit of $K_i$ as an element of a vector and a column vector of $l_i\times 1$, w as a matrix of $l_i\times l_g$, and $g_i$ as a column vector of $l_g\times 1$. Alternatively, for example, the conversion function $F\delta_z$ may perform calculation assuming that a number represented by a plurality of bits in $K_i$, $g_i$, and w as an element of a vector.

$$F\delta_i(K_i)=K_i+w\times g_i \qquad (66)$$

For another example, the conversion function $F\delta_i$ may output a result of operation of a sequence obtained by converting the client key $K_i$ with a function $F_{10}$ and a sequence obtained by converting the master key $g_i$ by a function $F_{11}$, as indicated by Expression (67) below. As an example, $F_{11}$ is a one-to-one function, a pseudo-random function, or a hash function.

$$F\delta_i(K_i)=F_{10}(K_i)\circ F_{11}(g_i) \qquad (67)$$

The conversion function $F\delta_i$ is not limited to such functions, but may be any function for converting the client key $K_i$ with the master key $g_i$, the management information w, or the like.

Figure 14:
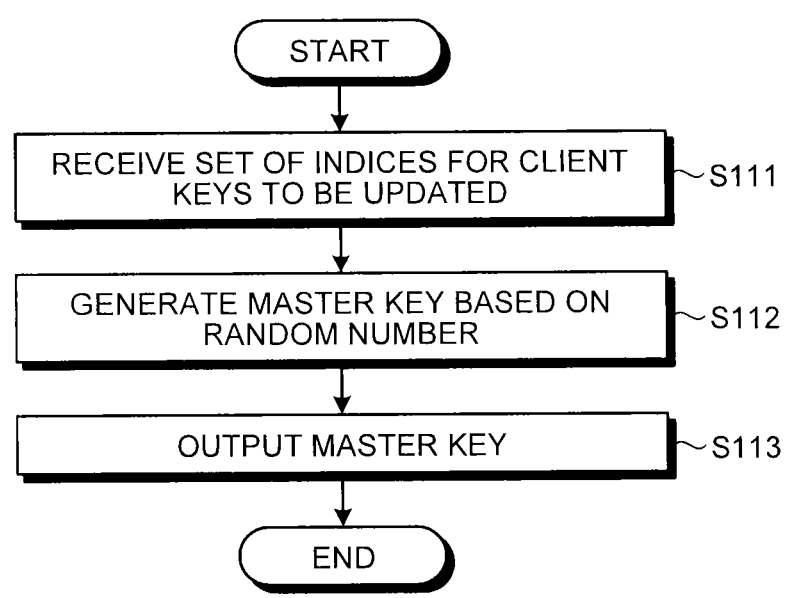
FIG. 14 is a flowchart of a process performed by the update unit according to the first example.

FIG. 14 is a flowchart of a process performed by the update unit 60 according to the first example. To begin with, at Step S111, the input unit 80 in the update unit 60 receives as input a set of indices i for specifying the client keys $K_i$ to be updated. Subsequently, at Step S112, the update information generator 82 generates a master key $g_i$ associated with each of the indices i input by the input unit 80 on the basis of a random number.

At Step S113, the output unit 83 then outputs the index i and the master key $g_i$ to the server 40. The output unit 83 also outputs, to the client terminals 30 storing the client key $K_i$ to be updated, the associated index i and the master key $g_i$.

Figure 15:
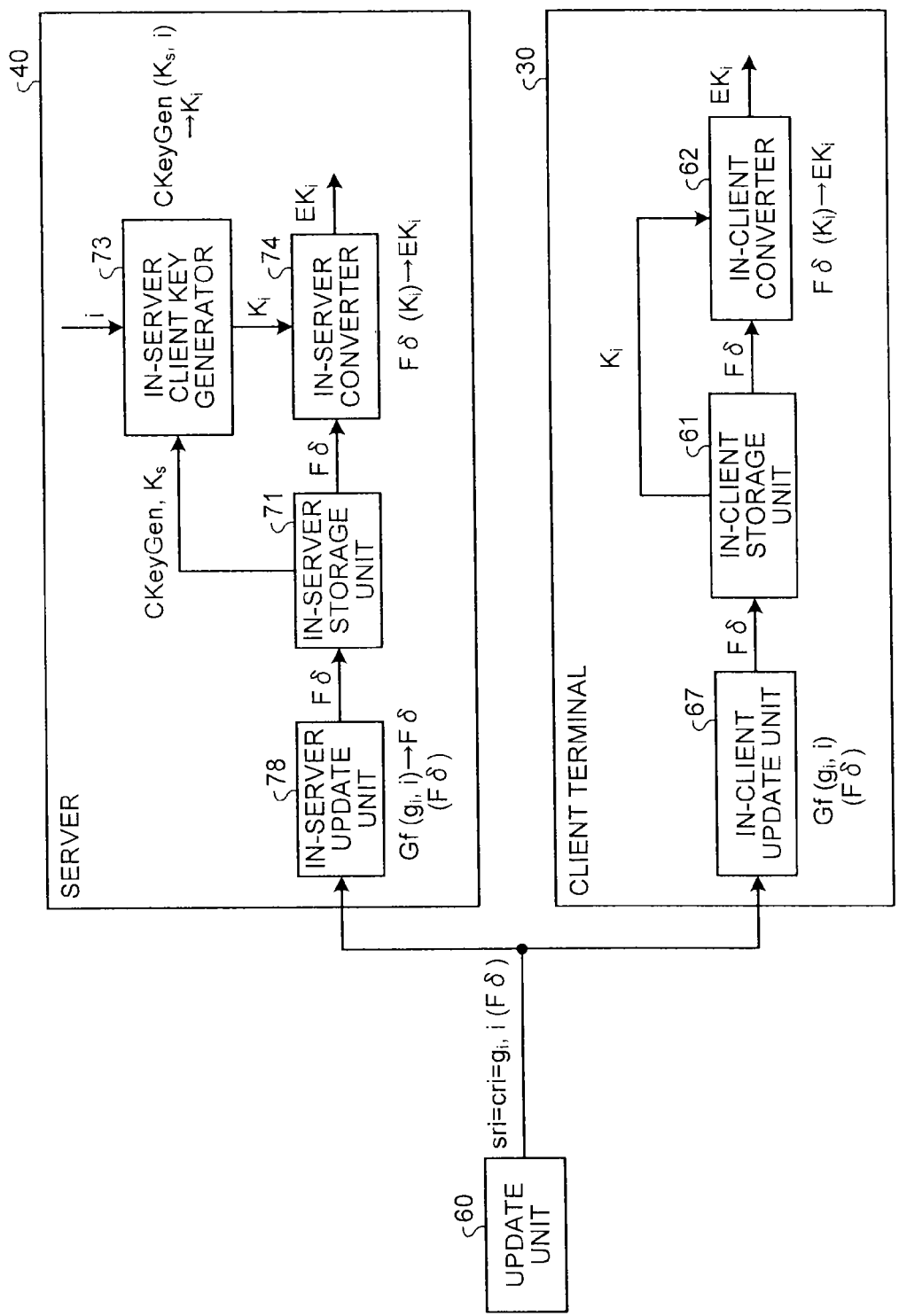
FIG. 15 is a schematic diagram of the configurations of a client terminal and a server according to the first example.

FIG. 15 is a schematic diagram of partial configurations of a client terminal 30 and the server 40 with the update unit 60 according to the first example.

In the first example, the in-client update unit 67 of the client terminal 30 to be updated acquires an index i and the master key $g_i$ from the update unit 60. The in-client update unit 67 inputs the acquired index i and master key $g_i$ to a pre-stored master function $Gf(g_i, i)$ to generate a conversion function $F\delta_i$. The master function $Gf(g_i, i)$ is a function for generating a conversion function $F\delta_i$ from the master key $g_i$ and an index i. The master function $Gf(g_i, i)$ may be public information or may be secret information generated by the generating device 20. The master function may also be $Gf(g_i, i, w)$ using the management information w as an argument. The conversion function $F\delta_i$ output from the master function is a function indicated by Expressions (60) to (67), for example.

The in-client update unit 67 then replaces the conversion function $F\delta_i$ stored in the in-client storage unit 61 with the newly generated conversion function $F\delta_i$. Alternatively, the in-client update unit 67 may acquire the conversion function $F\delta_i$ instead of the master key $g_i$ from the update unit 60. In this case, the in-client update unit 67 replaces the conversion function $F\delta_i$ stored in the in-client storage unit 61 with the acquired conversion function $F\delta_i$.

In encryption and decryption, the in-client converter 62 generates a new encryption key $EK_i$ on the basis of the existing client key $K_i$ stored in the in-client storage unit 61 and the new conversion function $F\delta_i$. In this manner, the client terminal 30 can conduct encrypted communication with the server 40 by using the new encryption key $EK_i$.

In the first example, the in-server update unit 78 in the server 40 acquires an index i and the master key $g_i$ from the update unit 60. The in-server update unit 78 inputs the acquired index i and master key $g_i$ to the master function $Gf(g_i, i)$ to generate a conversion function $F\delta_i$. The master function $Gf(g_i, i)$ is the same as that stored in the associated client terminal 30.

The in-server update unit 78 then replaces the conversion function $F\delta_i$ stored in the in-server storage unit 71 with the newly generated conversion function $F\delta_i$. Alternatively, the in-server update unit 78 may acquire the conversion function $F\delta_i$ instead of the master key $g_i$ from the update unit 60. In this case, the in-server update unit 78 replaces the conversion function $F\delta_i$ stored in the in-server storage unit 71 with the acquired conversion function $F\delta_i$.

In encryption and decryption, the in-server client key generator 73 generates a client key $K_i$ on the basis of an index i, the existing client key function $CKeyGen(K_S, i)$ and the existing server key $K_S$ stored in the in-server storage unit 71. The in-server converter 74 generates a new encryption key $EK_i$ on the basis of the generated client key $K_i$ and the new conversion function $F\delta_i$. In this manner, the server 40 can conduct encrypted communication with the client terminals 30 by using the new encryption keys $EK_i$.

According to the update unit 60 according to the first example, the encryption key $EK_i$ can be updated by updating the conversion function $F\delta_i$.

Figure 16:
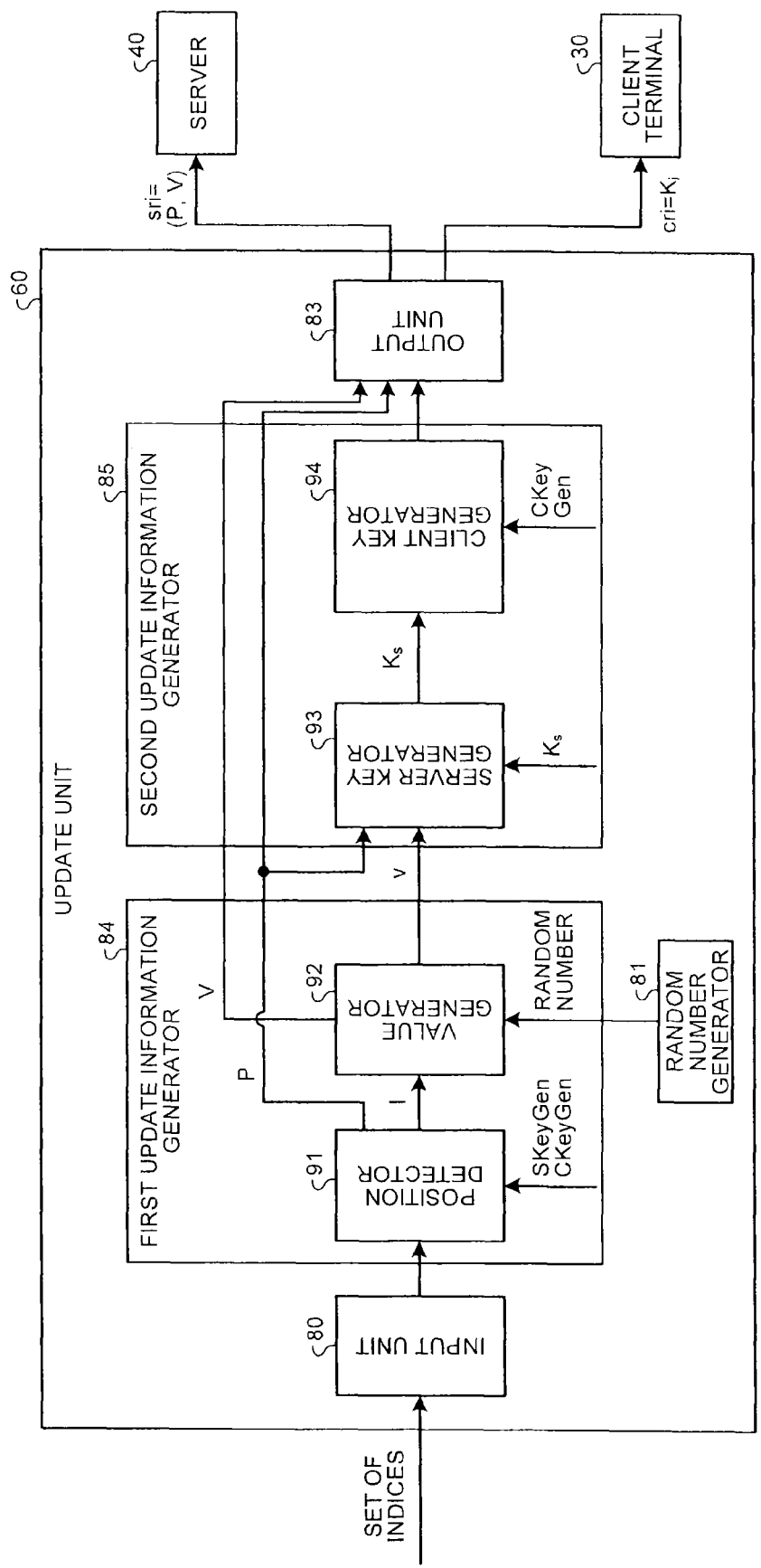
FIG. 16 is a schematic diagram of the configuration of an update unit according to a second example.

FIG. 16 is a schematic diagram of the configuration of the update unit 60 with a client terminal 30 and the server 40 according to a second example. In description of the second example, components having substantially the same configuration and functions as those in the first example will be designated by the same reference numerals and the description thereof will not be repeated except for differences.

In the second example, the generating device 20 updates the client keys $K_i$ to be updated. In addition, the generating device 20 updates some bits of the server key $K_S$. Specifically, the generating device 20 updates bits of the server key $K_S$ that are a seed for the client keys $K_i$ to be updated but are not a seed for the client keys $K_i$ not to be updated.

In the second example, the update unit 60 includes an input unit 80, a random number generator 81, a first update information generator 84, a second update information generator 85, and an output unit 83 as illustrated in FIG. 16.

The first update information generator 84 generates server key update information sri. The first update information generator 84 includes a position detector 91 and a value generator 92.

The position detector 91 detects a bit position (update position P) of the server key $K_S$ that is a seed for the client keys $K_i$ to be updated but is not a seed for the client keys $K_i$ not to be updated on the basis of each of the indices input by the input unit 80. Specifically, the position detector 91 detects such bit positions that a change in the bit values at the positions will result in a change in the client keys $K_i$ to be updated but will not result in a change in the client keys $K_i$ not to be updated.

For example, when the client key function $CKeyGen(K_S, i)$ executes conversion as illustrated in FIG. 10, the bit position of the partial sequence in the server key $K_S$ is known in advance. Thus, for the conversion illustrated in FIG. 10, the position detector 91 detects a bit position (update position P) that is a seed for the client keys $K_i$ to be updated but is not a seed for the client keys $K_i$ not to be updated on the basis of the known information.

For another example, when the client key function $(K_S, i)$ executes the conversion illustrated in FIG. 12, the position detector 91 detects such a bit position by reversely tracking the client key function $CKeyGen(K_S, i)$. An example of the reverse tracking will be described below. In FIG. 12, the converted server key $K_S'$ associated with the client key $K_i'$ before conversion is known because the selection of a partial sequence and the arrangement are defined. The position detector 91 thus detects a bit position of the server key $K_S$ before conversion that can be updated on the basis of association between the converted server key $K_S'$ and the server key $K_S$ before conversion.

The second example can be applied when the second data conversion $F\beta$ is replacement or linear conversion. Thus, a case in which $K_S'=F\beta(K_S)=\phi(K_S)$ is satisfied is assumed. $\phi$ is a matrix representing replacement or linear conversion. B is a set of bit positions of $K_S'$ to be updated. A position of a column where the b∈B-th row is 1 is assumed to be an update position P. This cannot be applied when a column with a row containing b and a row not containing b are both 1 is included in the matrix $\phi$.

Specific details are described below. $K_S'$ and $K_S$ are assumed to be as follows. Both of $x_i$ and $y_i$ are one bit.

$$K_s' = \begin{bmatrix} y_1 \\ y_2 \\ y_3 \\ y_4 \\ y_5 \end{bmatrix}, K_s = \begin{bmatrix} x_1 \\ x_2 \\ x_3 \\ x_4 \\ x_5 \end{bmatrix}$$

$$\begin{bmatrix} y_1 \\ y_2 \\ y_3 \\ y_4 \\ y_5 \end{bmatrix} = \begin{bmatrix} 0 & 1 & 0 & 0 & 1 \\ 0 & 0 & 1 & 1 & 0 \\ 1 & 0 & 0 & 0 & 1 \\ 0 & 0 & 0 & 1 & 0 \\ 0 & 0 & 1 & 0 & 0 \end{bmatrix} \begin{bmatrix} x_1 \\ x_2 \\ x_3 \\ x_4 \\ x_5 \end{bmatrix}$$

When values to be updated in $K_S'$ are $x_1$ and $y_3$, the bit positions to be updated are the first bit and the third bit. Thus, the set of bit positions to be updated in $K_S'$ is B={1,3}. Columns where the first (b=1) row is 1 are the second and the fifth columns. Columns where the third (b=3) row is 1 are the first and the fifth columns. Thus, in this specific example, the update positions P in the server key $K_S$ before conversion are P=1, 2, 5.

Since the bit positions are reversely tracked for detection, the client key function $CKeyGen(K_S, i)$ needs to be a function for changing or linearly converting the bit positions in the second example. Therefore, in the second example, the client key function $CKeyGen(K_S, i)$ is not a pseudo random function, a hash function and the like that cannot reversely track the bit positions.

The position detector 91 further generates information indicating the number 1 of total bits of the detected bit positions.

The value generator 92 generates an update value V of the number 1 of bits generated by the position detector 91 on the basis of a random number generated by the random number generator 81.

The second update information generator 85 generates client key update information cri. The second update information generator 85 includes a server key generator 93, and a client key generator 94.

The server key generator 93 generates a new server key $K_S$ resulting from update on the basis of the server key $K_S$ before update, the update positions P, and the update value V. Specifically, the server key generator 93 replaces the values at the bit positions represented by the update positions P in the server key $K_S$ before update with the values represented by the update values V. The client key generator 94 generates a new client key $K_i$ on the basis of the index i input by the input unit 80, the existing client key function CKeyGen($K_S$, i) and the new server key $K_S$ resulting from the update.

The output unit 83 outputs the update positions P and the update value V generated by the first update information generator 84 to the server 40. The output unit 83 also outputs, for each of the client terminals 30 storing the client keys $K_i$ to be updated, the new client key $K_i$ generated by the second update information generator 85.

Figure 17:
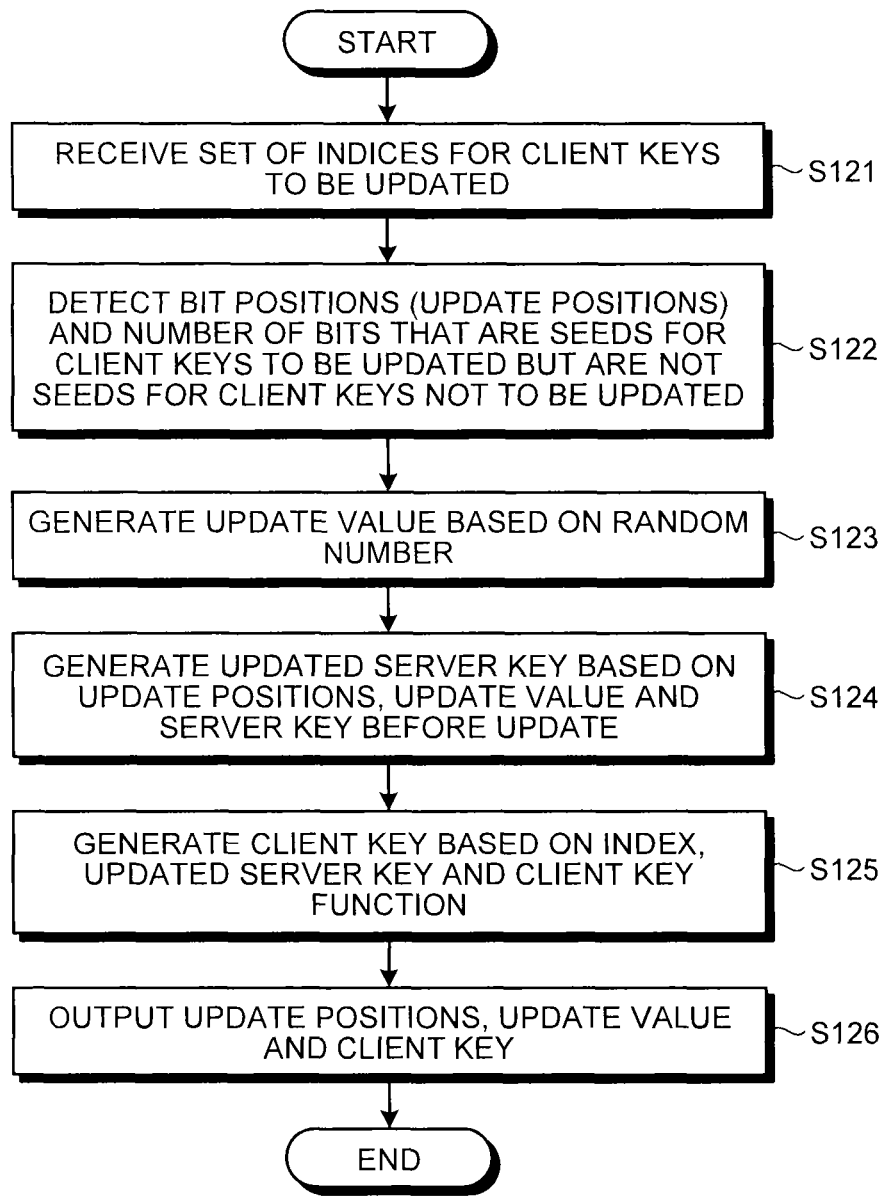
FIG. 17 is a flowchart of a process performed by the update unit according to the second example.

FIG. 17 is a flowchart of a process performed by the update unit 60 according to the second example. To begin with, at Step S121, the input unit 80 in the update unit 60 receives as input a set of indices i for specifying the client keys $K_i$ to be updated.

Subsequently, at Step S122, the first update information generator 84 detects a bit position (update position P) and the number 1 of bit of the server key $K_S$ that is a seed for the client keys $K_i$ to be updated but is not a seed for the client keys $K_i$ not to be updated on the basis of each of the indices i input by the input unit 80. Subsequently, at Step S123, the first update information generator 84 generates the update value V of the number 1 of bits on the basis of a random number.

Subsequently, at Step S124, the second update information generator 85 generate the new server key $K_S$ resulting from update on the basis of the update positions P, the update value V, and the server key $K_S$ before update. Subsequently, at Step S125, the second update information generator 85 generates a new client key $K_i$ on the basis of the index i input by the input unit 80, the new server key $K_S$ resulting from the update, and the existing client key function CKeyGen($K_S$, i).

At Step S126, the output unit 83 then outputs the update positions P and the update value V to the server 40. The output unit 83 also outputs, for each of the client terminals 30 storing the client keys $K_i$ to be updated, the new client key $K_i$.

Figure 18:
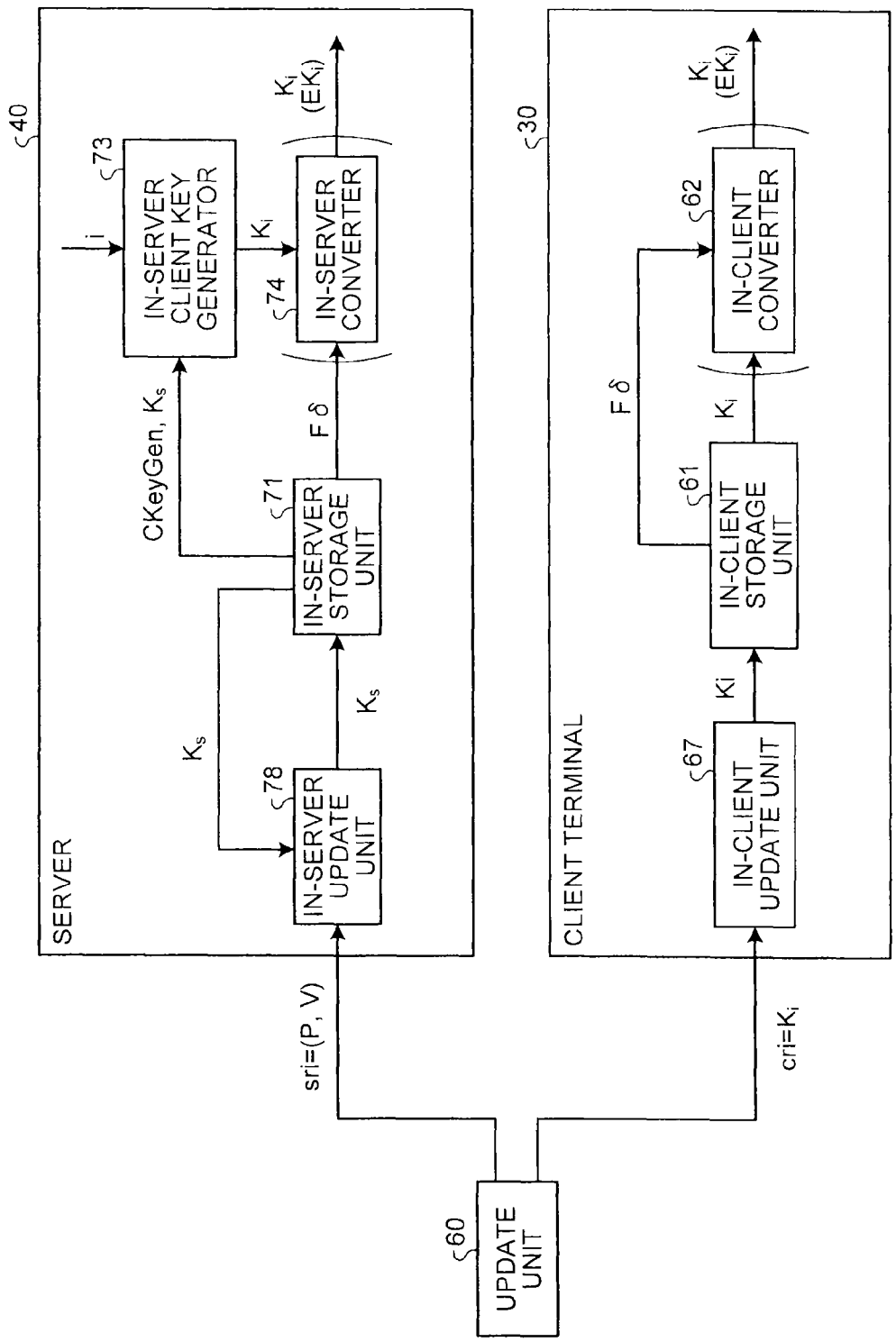
FIG. 18 is a schematic diagram of the configurations of a client terminal and a server according to the second example.

FIG. 18 is a schematic diagram of partial configurations of the client terminal 30 and the server 40 with the update unit 60 according to the second example. In the second example, the in-client update unit 67 in the client terminal 30 to be updated acquires a client key $K_i$ from the update unit 60. The in-client update unit 67 then replaces the client key $K_i$ stored in the in-client storage unit 61 with the acquired new client key $K_i$.

In this manner, the client terminal 30 can conduct encrypted communication with the server 40 by using the new client key $K_i$ stored in the in-client storage unit 61 in encryption and decryption.

When the client keys $K_i$ are seeds for generating the encryption keys $EK_i$, the in-client converter 62 generates a new encryption key $EK_i$ on the basis of the new client key $K_i$ stored by the in-client storage unit 61 and the existing conversion function $F\delta_i$. In this manner, the client terminal 30 can conduct encrypted communication with the server 40 by using the new encryption key $EK_i$.

In the second example, the in-server update unit 78 in the server 40 acquires the update positions P and the update value V from the update unit 60. The in-server update unit 78 generates a new server key $K_S$ resulting from update on the basis of the existing server key $K_S$ before update, the update positions P, and the update value V. Specifically, the in-server update unit 78 replaces the values at the bit positions represented by the update positions P in the server key $K_S$ before update with the values represented by the update values V. The in-server update unit 78 then replaces the existing server key $K_S$ stored in the in-server storage unit 71 with the new server key $K_S$ resulting from the update.

In encryption and decryption, the in-server client key generator 73 generates a new client key $K_i$ on the basis of an index i, the existing client key function CKeyGen($K_S$, i) stored by the in-server storage unit 71 and the new server key $K_S$ resulting from the update. In this manner, the server 40 can conduct encrypted communication with the client terminals 30 by using the new client key $K_i$.

When the client keys $K_i$ are seeds for generating the encryption keys $EK_i$, the in-server converter 74 generates a new encryption key $EK_i$ on the basis of the newly generated client key $K_i$ and the existing conversion function $F\delta_i$. In this manner, the server 40 can conduct encrypted communication with the client terminals 30 by using the new encryption keys $EK_i$.

When the client keys $K_i$ are seeds for generating the encryption keys $EK_i$, the server 40 may use a combined function CEKGen($K_S$, i) obtained by combining the client key function CKeyGen($K_S$, i) and the conversion function $F\delta_i$. In this case, the in-server storage unit 71 stores the combined function CEKGen($K_S$, i) instead of the client key function CKeyGen($K_S$, i) and the conversion function $F\delta_i$. The in-server client key generator 73 then generates a new encryption key $EK_i$ on the basis of an index i, the existing combined function CEKGen($K_S$, i) stored by the in-server storage unit 71 and the new server key $K_S$.

When the client keys $K_i$ are seeds for generating the encryption keys $EK_i$, the update unit 60 may generate a new encryption key $EK_i$ instead of the new client key $K_i$ resulting from the update and transmit the new encryption key $EK_i$ to the client terminal 30. In this case, the in-client update unit 67 replaces the encryption key $EK_i$ stored in the in-client storage unit 61 with the acquired new encryption key $EK_i$.

According to the update unit 60 according to the second example, the client key $K_i$ or the encryption key $EK_i$ can be updated by updating part of the server key $K_S$.

Figure 19:
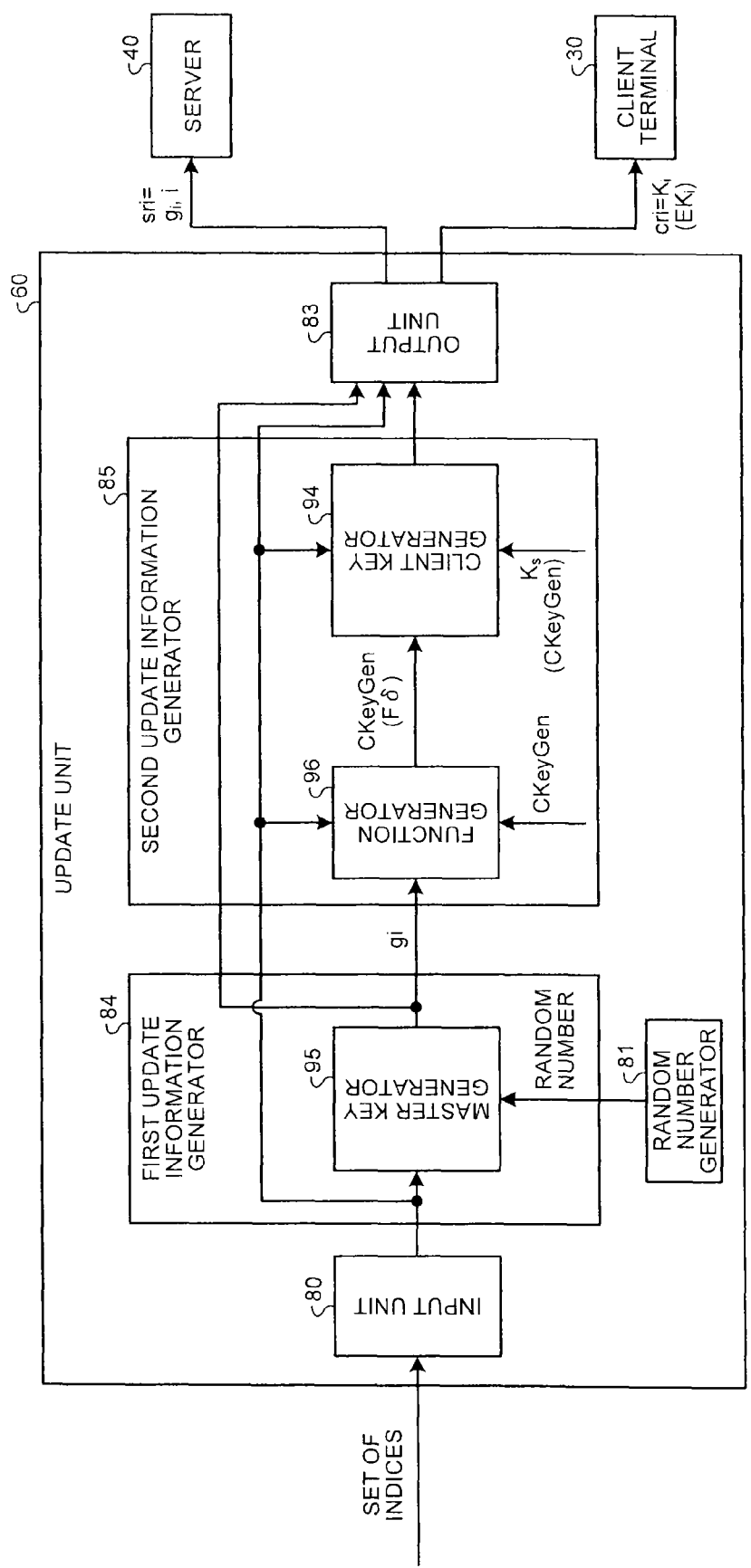
FIG. 19 is a schematic diagram of the configuration of an update unit according to a third example.

FIG. 19 is a schematic diagram of the configuration of the update unit 60 with a client terminal 30 and the server 40 according to a third example. In description of the third example, components having substantially the same configuration and functions as those in the second example will be designated by the same reference numerals and the description thereof will not be repeated except for differences.

In the third example, a client key function CKeyGen($K_S$, i) includes multiple different functions being associated with multiple client keys $K_i$, respectively. For example, the client key function CKeyGen($K_S$, i) is composed of multiple functions being associated with multiple client keys $K_i$, respectively. For example, the client key function CKeyGen($K_S$, i) contains multiple partial functions corresponding to the third data conversion $F\gamma$ for converting a partial sequence of the client key $K_1$ to be updated into the client key $K_1$ illustrated in FIG. 12. Thus, with the client key function CKeyGen($K_S$, i), the client key $K_i$ generated in association with a specified index i is changed by changing the function part associated with the specified index i.

The generating device 20 outputs a master function Gf($g_i$, i) together with the server key $K_S$. In the third example, the master function Gf($g_i$, i) is a function for generating a function part of the client key function CKeyGen($K_S$, i) corresponding to a specified index i from the master key $g_i$ and the index i. In other words, when the master key $g_i$ and an index i are input to the master function $Gf(g_i, i)$, a function part corresponding to the index i contained in the client key function $CKeyGen(K_S, i)$ is generated.

In the third example, the update unit 60 updates the client keys $K_i$ to be updated. In addition, the update unit 60 updates master key $g_i$ to update a function part corresponding to the client key $K_i$ to be updated contained in the client key function $CKeyGen(K_S, i)$.

In the client key function $CKeyGen(K_S, i)$, when the third data conversion $F\gamma$ is different for each client in the conversion illustrated in FIG. 12, the third data conversion $F\gamma$ is the function part corresponding to the index i. The third data conversion $F\gamma$ corresponding to the index i will be referred to as $F\gamma_i$.

The master function $Gf(g_i, i)$ outputs the third data conversion $F\gamma$ as in the following example, for example. Note that the update information generator 82 may generate the third data conversion $F\gamma$ on the basis of information such as a system management number and a revision number in addition to the master key $g_i$. Here, information other than the master key $g_i$ will be referred to as management information w. The management information w may be either secret information or public information. In this case, the master function $Gf(g_i, i, w)$ outputs the third data conversion $F\gamma$.

For example, the third data conversion $F\gamma$ may be a function that outputs an arithmetic sum, an arithmetic product, or an exclusive OR of the client key $K_i'$ before conversion and the master key $g_i$ as indicated by Expressions (70) to (72) below. Expression (72) is an expression when $K_i'$ and $g_i$ have the same bit length.

$$F\delta_i(K_i')=K_i'+g_i \quad (70)$$

$$F\delta_i(K_i')=K_i'\times g_i \quad (71)$$

$$F\delta_i(K_i')=K_i'\oplus g_i \quad (72)$$

For another example, the third data conversion $F\gamma_i$ may be a function that outputs a result of operation on the client key $K_i'$ before conversion, the master key $g_i$, and the management information w as indicated by Expression (73) below.

$$F\gamma_i(K_i')=K_i'\circ g_i\circ w \quad (73)$$

For another example, the third data conversion $F\gamma_i$ may be a function that outputs a sequence obtained by converting the sum, the product, or the exclusive OR of the client key $K_i'$ before conversion, the master key $g_i$, and the management information w with a function $F_{12}$ as indicated by Expression (74) below. As an example, $F_{12}$ is a one-to-one function, a pseudo-random function, or a hash function. $F_{12}$ outputs $l_i$ bits for an input of $l_i$ bits.

$$F\gamma_i(K_i')=F_{12}(K_i'\circ g_i\circ w) \quad (74)$$

For another example, the third data conversion $F\gamma_i$ may assume $K_i'$ as a row vector and multiply $K_i'$ by an invertible matrix $g_i$ from the right as indicated by Expression (75) below. For example, the third data conversion $F\gamma_i$ performs the calculation assuming one bit of $K_i$ as an element of a vector and a row vector of $1\times l_i$, and $g_i$ as an invertible matrix $l_i\times l_1$. Alternatively, for example, the third data conversion $F\gamma_i$ may perform calculation assuming that a number represented by a plurality of bits in $K_i'$ as an element of a vector.

$$F\gamma_i(K_i')=K_i'\times g_i \quad (75)$$

For another example, the third data conversion $F\gamma_i$ may assume $K_i'$ as a column vector and add the product of a matrix w and the column vector $g_i$ as indicated by Expression (76) below. For example, the third data conversion $F\gamma_1$ performs the calculation assuming one bit of $K_i'$ as an element of a vector and a column vector of $l_i\times 1$, w as a matrix of $l_i\times l_g$, and $g_i$ as a column vector of $l_g\times 1$. Alternatively, for example, the third data conversion $F\gamma_i$ may perform calculation assuming that a number represented by a plurality of bits in $K_i'$, $g_i$, and w as an element of a vector.

$$F\gamma_i(K_i')=K_i'+w\times g_i \quad (76)$$

For another example, the third data conversion $F\gamma_i$ may output a result of operation of a sequence obtained by converting the client key $K_i$ with a function $F_{12}$ and a sequence obtained by converting the master key $g_i$ by a function $F_{13}$, as indicated by Expression (77) below. As an example, $F_{13}$ is a one-to-one function, a pseudo-random function, or a hash function.

$$F\gamma_i(K_i')=F_{12}(K_i')\circ F_{13}(g_i) \quad (77)$$

The third data function $F\gamma_i$ is not limited to such functions, but may be any function for converting the client key $K_i'$ before conversion with the master key $g_i$, the management information w, or the like, into the client key $K_i$.

Consider a case in which the client key function $CKeyGen(K_S, i)$ assumes that an output of a function $H(i)$ represents a bit position in $K_S$ and generates a client key by concatenating bits at such positions in K. The function H is a hash function, a pseudo random function, or the like. In this case, the master function $Gf(g_i, i, w)$ outputs a function $H(i\circ g_i\circ w)$.

The update unit 60 includes an input unit 80, a random number generator 81, a first update information generator 84, a second update information generator 85, and an output unit 83 as illustrated in FIG. 19.

The first update information generator 84 includes a master key generator 95. The master key generator 95 generates a master key $g_i$ on the basis of a random number generated by the random number generator 81.

The second update information generator 85 includes a function generator 96, and a client key generator 94. The function generator 96 stores a master function $Gf(g_i, i)$, and generates a function part corresponding to an index i input by the input unit 80 contained in the client key function $CKeyGen(K_S, i)$ on the basis of the index i input by the input unit 80 and a master key $g_i$ generated by the master key generator 95. The function generator 96 then replaces the part of the existing client key function $CKeyGen(K_S, i)$ corresponding to the index i input by the input unit 80 with a new function to generate a new client key function $CKeyGen(K_S, i)$.

The client key generator 94 generates a new client key $K_i$ on the basis of the index i input by the input unit 80, the new client key function $CKeyGen(K_S, i)$ generated by the function generator 96 and the existing server key $K_S$.

The output unit 83 outputs the master key $g_i$ generated by the first update information generator 84 and the index i input by the input unit 80 as server key update information sri to the server 40. The output unit 83 also outputs, for each of the client terminals 30 storing the client keys $K_i$ to be updated, the new client key $K_i$ generated by the second update information generator 85 as the client key update information cri.

In the third example, when the client keys $K_i$ are seeds for generating the encryption keys $EK_i$, the master function $Gf(g_i, i)$ may generate a conversion function $F\delta_i$ associated with a specified index from the master key $g_i$ and the index i. In this case, the function generator 96 generates a new conversion function $F\delta_i$ on the basis of the index i and the master key $g_i$. In this case, the client key generator 94 generates a new encryption key $EK_i$ on the basis of the index input by the input unit 80, the new conversion function $F\delta_i$ generated by the function generator 96, the existing client key function $CKeyGen(K_S, i)$ and the existing server key $K_S$. The output unit 83 then outputs the new encryption key $EK_i$ as client key update information cri. The output unit 83 may also output the client key $K_i$ and the conversion function $F\delta_i$ as the client key update information cri.

Alternatively, in the third example, when the client keys $K_i$ are seeds for generating the encryption keys $EK_i$, the function generator 96 may generate a combined function $CEKGen(K_S, i)$ obtained by combining the new client key function $CKeyGen(K_S, i)$ and the existing conversion function $F\delta_i$ or a combined function $CEKGen(K_S, i)$ obtained by combining the existing client key function $CKeyGen(K_S, i)$ and the new conversion function $F\delta_i$. The output unit 83 may transmit the combined function $CEKGen(K_S, i)$ as the server key update information sri to the server 40. In this case, the client key generator 94 generates a new encryption key $EK_i$ on the basis of the index i input by the input unit 80, the combined function $CEKGen(K_S, i)$, and the existing server key $K_S$. In this case, the output unit 83 then outputs the new encryption key $EK_i$ as the client key update information cri.

Figure 20:
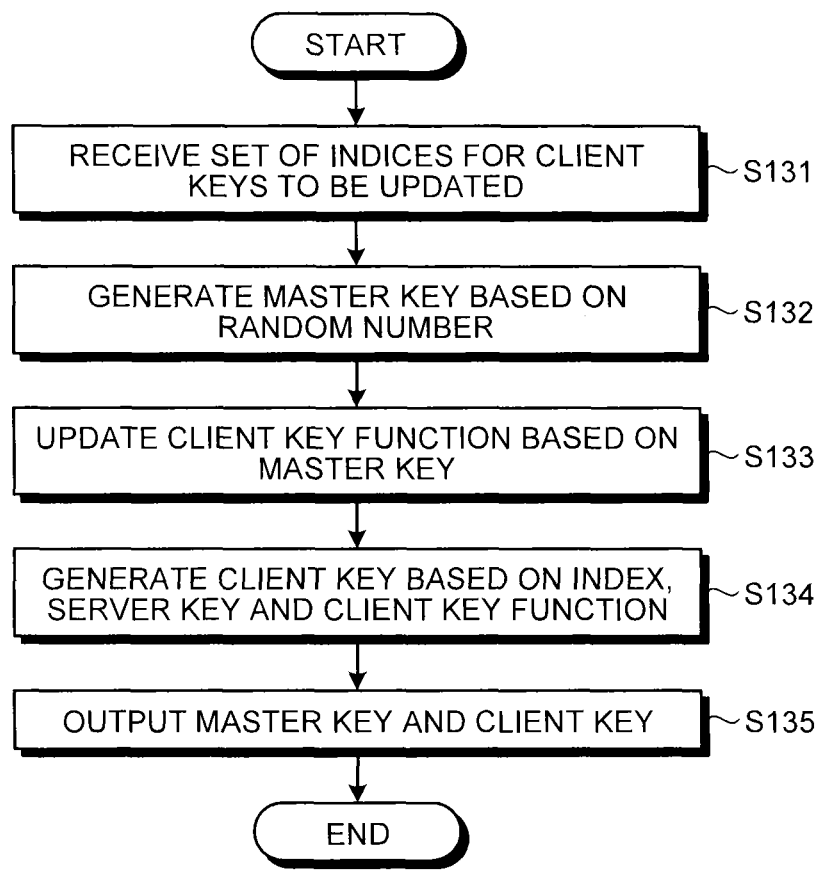
FIG. 20 is a flowchart of a process performed by the update unit according to the third example.

FIG. 20 is a flowchart of a process performed by the update unit 60 according to the third example. To begin with, at Step S131, the input unit 80 in the update unit 60 receives as input a set of indices i for specifying the client keys $K_i$ to be updated.

Subsequently, at Step S132, the first update information generator 84 generates a master key $g_i$ on the basis of a random number. Subsequently, at Step S133, the second update information generator 85 generates a new client key function $CKeyGen(K_S, i)$ on the basis of the master key $g_i$.

Subsequently, at Step S134, the second update information generator 85 generates a new client key $K_i$ on the basis of the index i input by the input unit 80, the existing server key $K_S$, and the new client key function $CKeyGen(K_S, i)$.

At Step S135, the output unit 83 then outputs the master key $g_i$ and the index i to the server 40. The output unit 83 also outputs, for each of the client terminals 30 storing the client keys $K_i$ to be updated, the new client key $K_i$.

Figure 21:
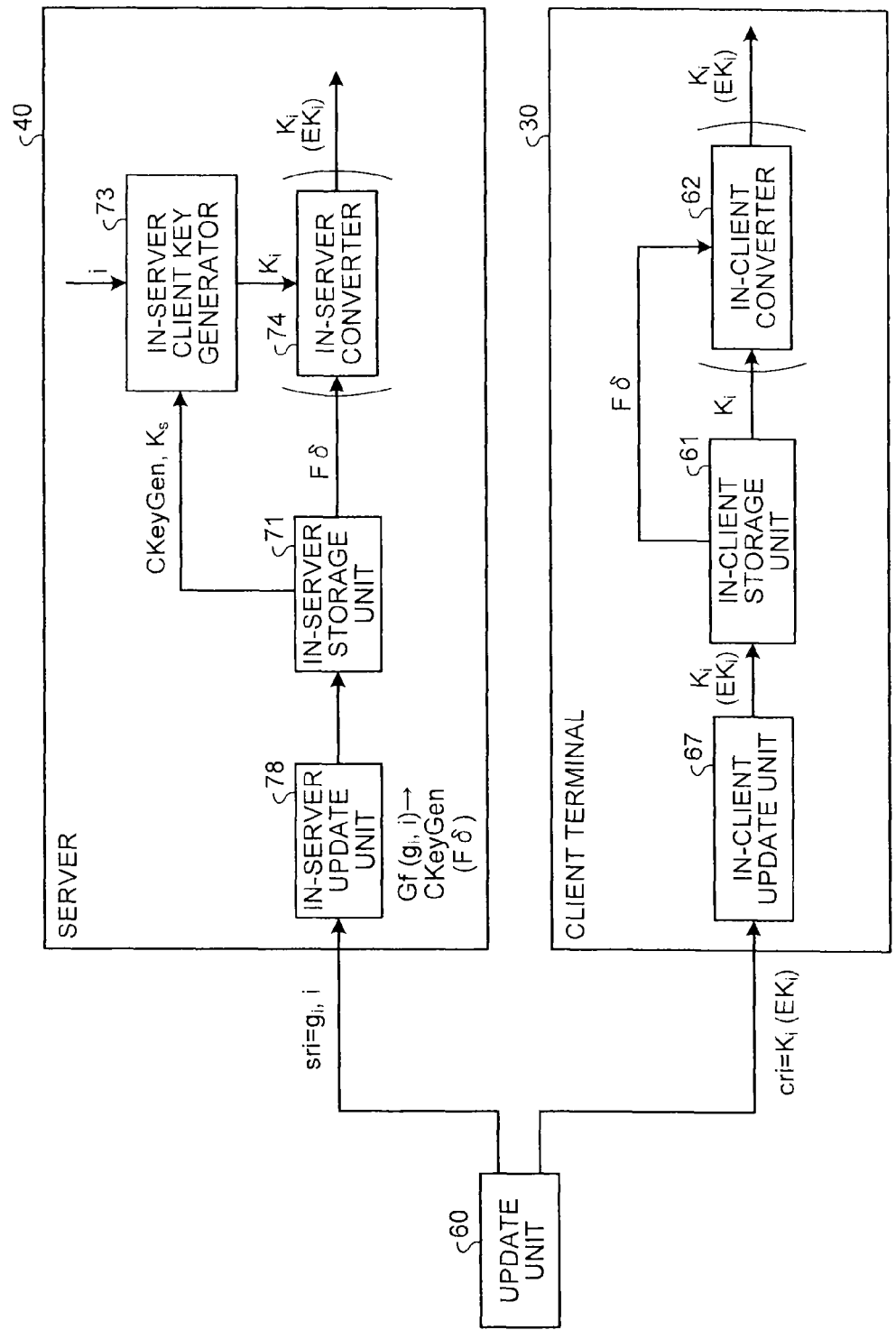
FIG. 21 is a schematic diagram of the configurations of a client terminal and a server according to the third example.

FIG. 21 is a schematic diagram of partial configurations of a client terminal 30 and the server 40 with the update unit 60 according to the third example. In the third example, the in-client update unit 67 in the client terminal 30 to be updated acquires a client key $K_i$ from the update unit 60. The in-client update unit 67 then replaces the client key $K_i$ stored in the in-client storage unit 61 with the acquired new client key $K_i$. In this manner, the client terminal 30 can conduct encrypted communication with the server 40 by using the new client key $K_i$ stored in the in-client storage unit 61 in encryption and decryption.

In the third example, when the client keys $K_i$ are seeds for generating the encryption keys $EK_i$, the in-client converter 62 generates a new encryption key $EK_i$ on the basis of the new client key $K_i$ stored by the in-client storage unit 61 and the existing conversion function $F\delta_i$. In this manner, the client terminal 30 can conduct encrypted communication with the server 40 by using the new encryption key $EK_i$.

In the third example, when the client keys $K_i$ are seeds for generating the encryption keys $EK_i$, the in-client update unit 67 may acquire a new encryption key $EK_i$ instead of the new client key $K_i$ resulting from the update from the update unit 60. In this case, the in-client update unit 67 replaces the encryption key $EK_i$ stored in the in-client storage unit 61 with the acquired new encryption key $EK_i$.

In the third example, the in-server update unit 78 in the server 40 acquires an index i and the master key $g_i$ from the update unit 60. The in-server update unit 78 inputs the acquired master key $g_i$ and index i to the master function $Gf(g_i, i)$ stored in advance to generate a function part corresponding to the index i input by the input unit 80 contained in the client key function $CKeyGen(K_S, i)$. The function part corresponds to the function part to be updated by the update unit 60. The in-server update unit 78 then replaces the part of the existing client key function $CKeyGen(K_1, i)$ corresponding to the index i input by the input unit 80 with a new function to generate a new client key function $CKeyGen(K_S, i)$. The in-server update unit 78 then replaces the existing client key function $CKeyGen(K_S, i)$ stored in the in-server storage unit 71 with the new client key function $CKeyGen(K_S, i)$.

In encryption and decryption, the in-server client key generator 73 generates a new client key $K_i$ on the basis of an index i, the new client key function $CKeyGen(K_S, i)$ stored by the in-server storage unit 71, and the existing server key $K_S$. In this manner, the server 40 can conduct encrypted communication with the client terminals 30 by using the new client key $K_i$.

In the third example, when the client keys $K_i$ are seeds for generating the encryption keys $EK_i$ and the master function $Gf(g_i, i)$ is a function for generating a conversion function $F\delta_i$, the in-server update unit 78 generates a new conversion function $F\delta_i$ on the basis of the master key $g_i$. In this case, the in-server converter 74 generates a new encryption key $EK_i$ on the basis of the existing client key $K_i$ and the new conversion function $F\delta_i$. In this manner, the server 40 can conduct encrypted communication with the client terminals 30 by using the new encryption keys $EK_i$.

Alternatively, in the third example, when the client keys $K_i$ are seeds for generating the encryption keys $EK_i$, the in-server update unit 78 may generate a new combined function $CEKGen(K_S, i)$ obtained by combining the new client key function $CKeyGen(K_S, i)$ and the existing conversion function $F\delta_i$ or a new combined function $CEKGen(K_S, i)$ obtained by combining the existing client key function $CKeyGen(K_S, i)$ and the new conversion function $F\delta_i$. The in-server update unit 78 may acquire the combined function $CEKGen(K_S, i)$ from the generating device 20. In this case, the in-server update unit 78 replaces the combined function $CEKGen(K_S, i)$ stored in the in-server storage unit 71 with the new combined function $CEKGen(K_S, i)$. In encryption and decryption, the in-server client key generator 73 then generates a new encryption key $EK_i$ on the basis of an index i, the new combined function $CEKGen(K_S, i)$ stored by the in-server storage unit 71, and the existing server key $K_S$. In this manner, the server 40 can conduct encrypted communication with the client terminals 30 by using the new encryption keys $EK_i$.

According to the update unit 60 according to the third example, the client key $K_i$ or the encryption key $EK_i$ can be updated by updating the client key function $CKeyGen(K_S, i)$ by using the master key $g_i$.

Figure 22:
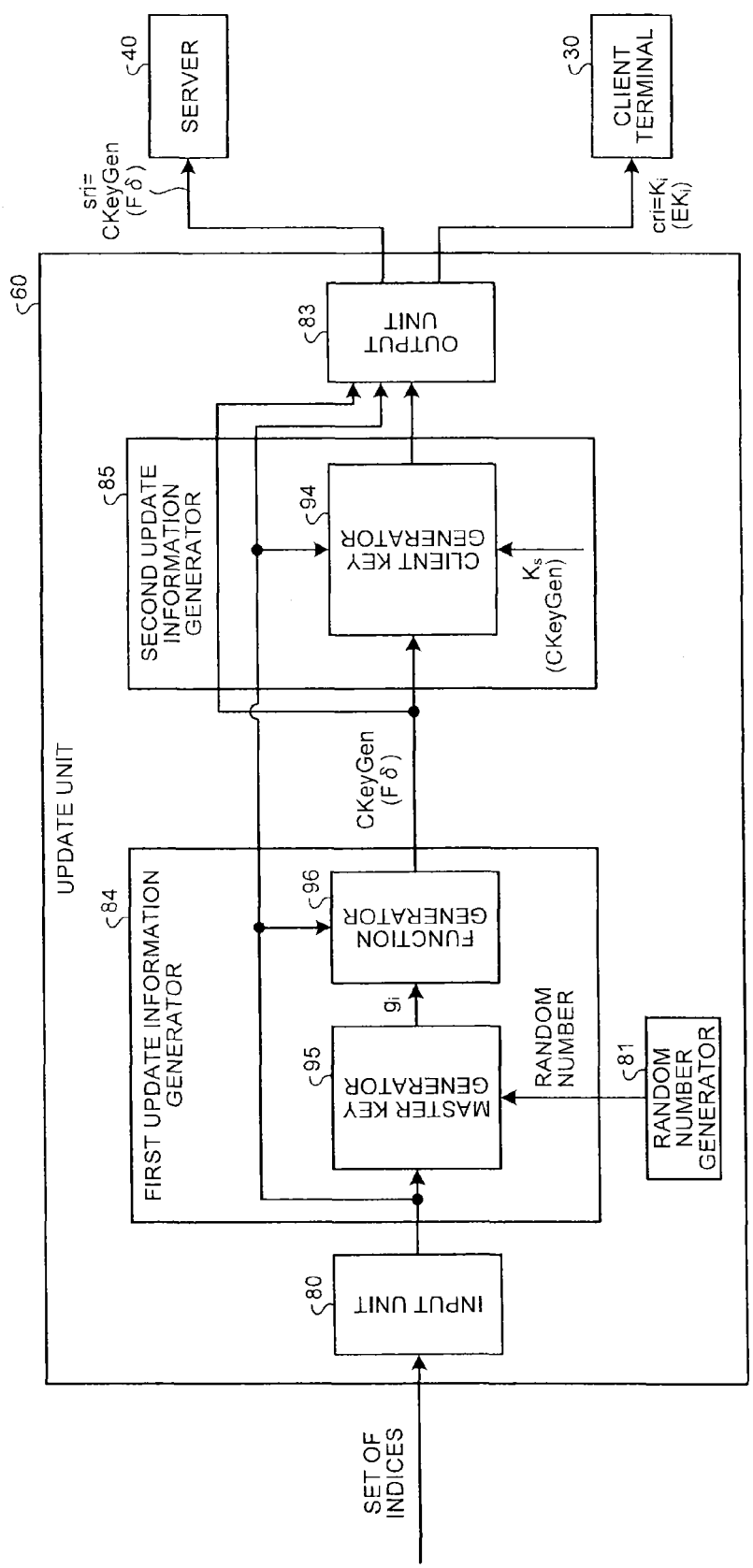
FIG. 22 is a schematic diagram of the configuration of an update unit according to a fourth example.

FIG. 22 is a schematic diagram of the configuration of the update unit 60 with a client terminal 30 and the server 40 according to a fourth example. In description of the fourth example, components having substantially the same configuration and functions as those in the third example will be designated by the same reference numerals and the description thereof will not be repeated except for differences.

In the fourth example, the update unit 60 updates the client keys $K_i$ to be updated. In addition, the update unit 60 generates a new client key function CKeyGen($K_S$, i) to update the client key function CKeyGen($K_S$, i) stored by the server 40.

The update unit 60 includes an input unit 80, a random number generator 81, a first update information generator 84, a second update information generator 85, and an output unit 83 as illustrated in FIG. 22.

The first update information generator 84 includes a master key generator 95 and a function generator 96. The second update information generator 85 includes a client key generator 94.

The output unit 83 outputs the new client key function CKeyGen($K_S$, i) generated by the first update information generator 84 as server key update information sri to the server 40. The output unit 83 also outputs, for each of the client terminals 30 storing the client keys $K_i$ to be updated, the new client key $K_i$ generated by the second update information generator 85 as the client key update information cri.

In the fourth example, when the client keys $K_i$ are seeds for generating the encryption keys $EK_i$, the master function Gf($g_i$, i) may generate a conversion function F$\delta_i$ associated with a specified index from the master key $g_i$ and the index i. In this case, the function generator 96 generates a new conversion function F$\delta_i$ on the basis of the index i and the master key $g_i$. The output unit 83 then outputs the new conversion function F$\delta_i$ instead of the client key function CKeyGen($K_S$, i) as server key update information sri to the server 40.

Figure 23:
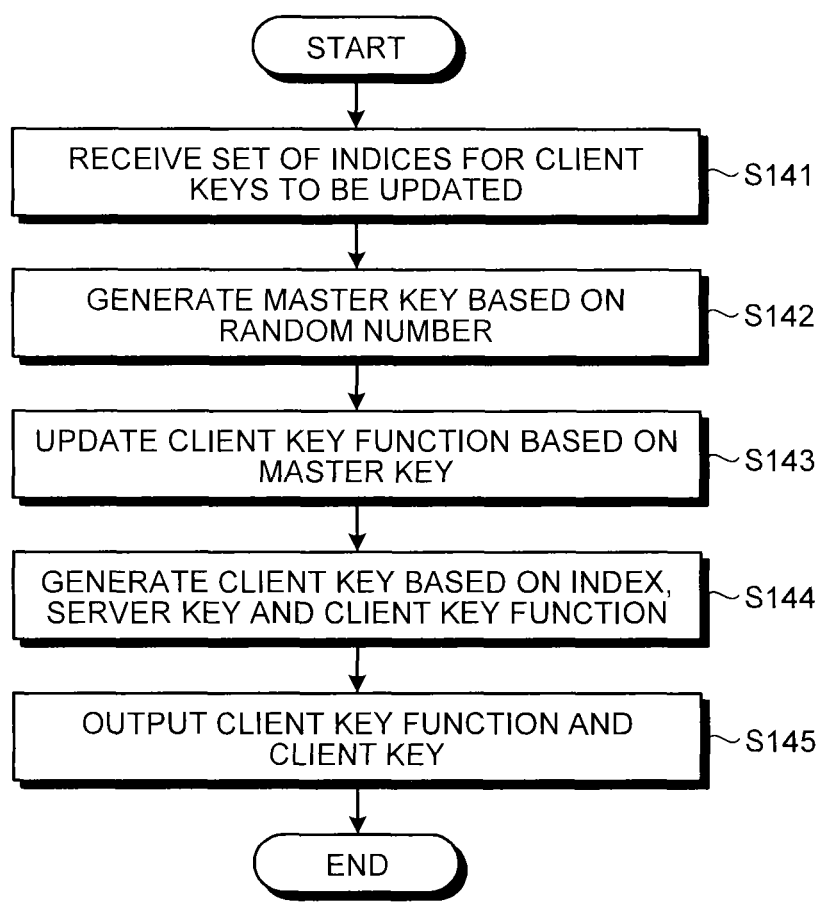
FIG. 23 is a flowchart of a process performed by the update unit according to the fourth example.

FIG. 23 is a flowchart of a process performed by the update unit 60 according to the fourth example. To begin with, at Step S141, the input unit 80 in the update unit 60 receives as input a set of indices i for specifying the client keys $K_i$ to be updated.

Subsequently, at Step S142, the first update information generator 84 generates a master key $g_i$ on the basis of a random number. Subsequently, at Step S143, the first update information generator 84 generates a new client key function CKeyGen($K_S$, i) on the basis of the master key $g_i$.

Subsequently, at Step S144, the second update information generator 85 generates a new client key $K_i$ on the basis of the index i input by the input unit 80, the existing server key $K_S$, and the new client key function CKeyGen($K_S$, i).

At Step S145, the output unit 83 then outputs the client key function CKeyGen($K_S$, i) to the server 40. The output unit 83 also outputs, for each of the client terminals 30 storing the client keys $K_i$ to be updated, the new client key $K_i$.

Figure 24:
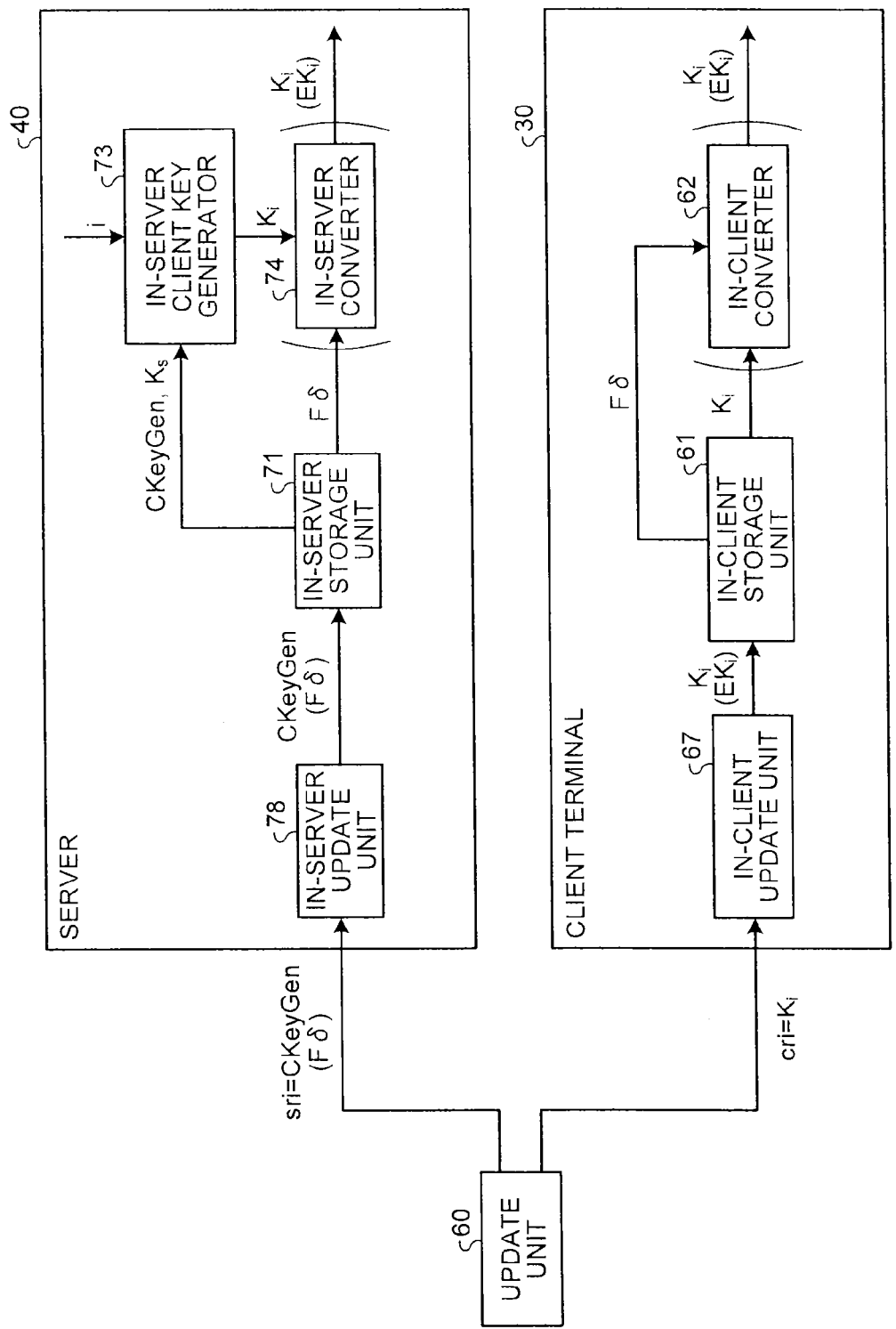
FIG. 24 is a schematic diagram of the configurations of a client terminal and a server according to the fourth example.

FIG. 24 is a schematic diagram of partial configurations of a client terminal 30 and the server 40 with the update unit 60 according to the fourth example.

In the fourth example, the in-server update unit 78 in the server 40 acquires the new client key function CKeyGen($K_S$, i) from the update unit 60. The in-server update unit 78 replaces the existing client key function CKeyGen($K_S$, i) stored in the in-server storage unit 71 with the acquired new client key function CKeyGen($K_S$, i).

In encryption and decryption, the in-server client key generator 73 generates a new client key $K_i$ on the basis of an index i, the new client key function CKeyGen($K_S$, i) stored by the in-server storage unit 71, and the existing server key $K_S$. In this manner, the server 40 can conduct encrypted communication with the client terminals 30 by using the new client key $K_i$.

In the fourth example, when the client keys $K_i$ are seeds for generating the encryption keys $EK_i$ and the master function Gf($g_i$, i) is a function for generating a conversion function F$\delta_i$, the in-server update unit 78 acquires a new conversion function F$\delta_i$ instead of the client key function CKeyGen($K_S$, i) from the update unit 60. The in-server update unit 78 then replaces the existing conversion function F$\delta_i$ stored in the in-server storage unit 71 with the acquired new conversion function F$\delta_i$. In this case, in encryption and decryption, the in-server client key generator 73 generates a client key $K_i$ on the basis of an index i, the existing client key function CKeyGen($K_S$, i) and the existing server key $K_S$ stored in the in-server storage unit 71. The in-server converter 74 generates a new encryption key $EK_i$ on the basis of the generated client key $K_i$ and the new conversion function F$\delta_i$ stored by the in-server storage unit 71. In this manner, the server 40 can conduct encrypted communication with the client terminals 30 by using the new encryption keys $EK_i$.

Alternatively, in the fourth example, when the client keys $K_i$ are seeds for generating the encryption keys $EK_i$, the in-server update unit 78 may acquire a new combined function CEKGen($K_S$, i) obtained by combining the new client key function CKeyGen($K_S$, i) and the existing conversion function F$\delta_i$ or a new combined function CEKGen($K_S$, i) obtained by combining the existing client key function CKeyGen($K_S$, i) and the new conversion function F$\delta_i$ from the update unit 60. In this case, the in-server update unit 78 replaces the combined function CEKGen($K_S$, i) stored in the in-server storage unit 71 with the acquired new combined function CEKGen($K_S$, i). In encryption and decryption, the in-server client key generator 73 then generates a new encryption key $EK_i$ on the basis of an index i, the new combined function CEKGen($K_S$, i) stored by the in-server storage unit 71, and the existing server key $K_S$. In this manner, the server 40 can conduct encrypted communication with the client terminals 30 by using the new encryption keys $EK_i$.

According to the update unit 60 according to the fourth example, the client key $K_i$ or the encryption key $EK_i$ can be updated by updating the client key function CKeyGen($K_S$, i) stored by the server 40.

Figure 25:
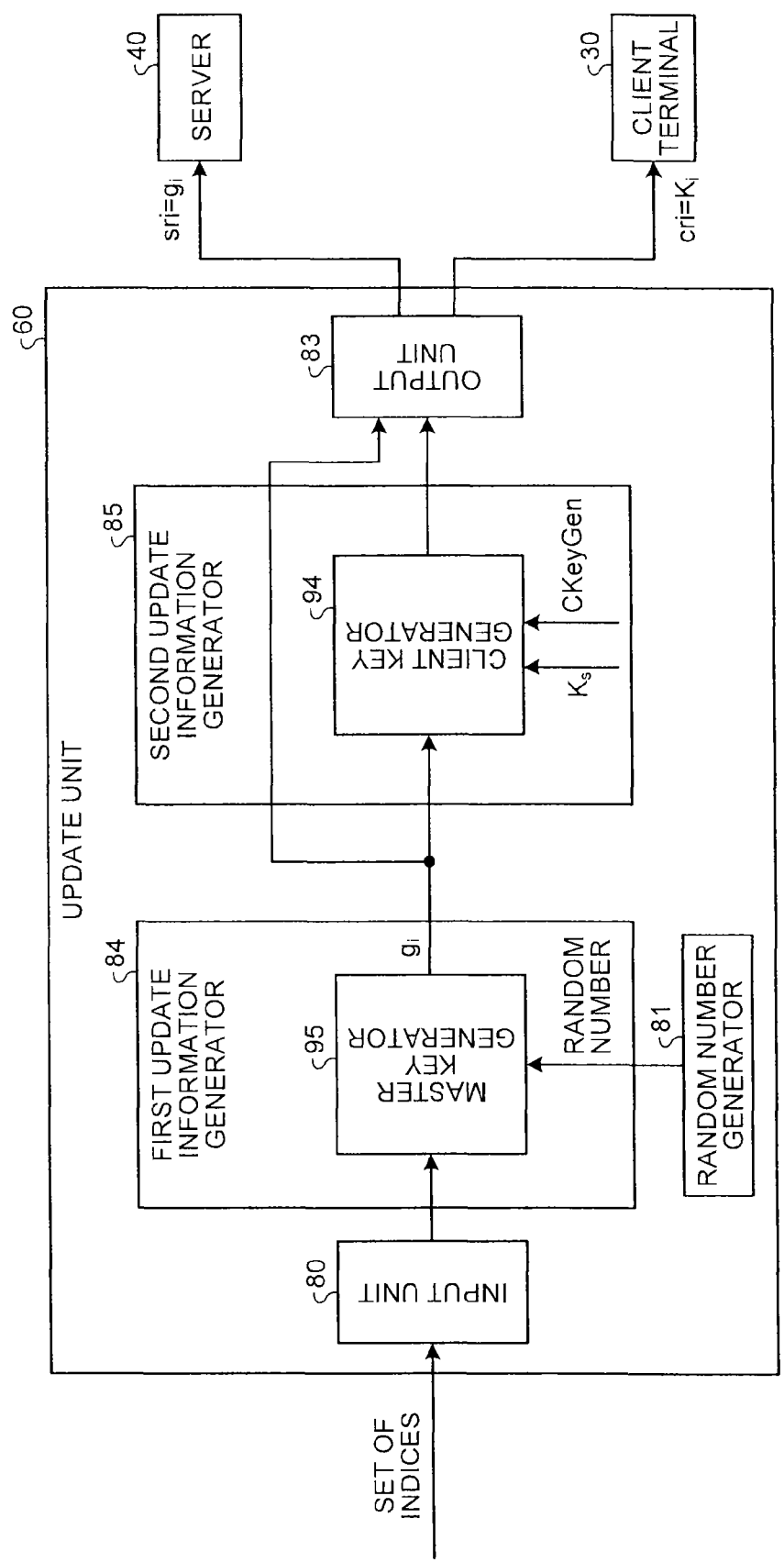
FIG. 25 is a schematic diagram of the configuration of an update unit according to a fifth example.

FIG. 25 is a schematic diagram of the configuration of the update unit 60 with a client terminal 30 and the server 40 according to a fifth example. In description of the fifth example, components having substantially the same configuration and functions as those in the fourth example will be designated by the same reference numerals and the description thereof will not be repeated except for differences.

In the fifth example, a client key function CKeyGen($K_S$, $g_i$, i) generates a client key $K_i$ specified by an index i on the basis of the index i, a server key $K_S$, and a master key $g_i$. In other words, the client key function CKeyGen($K_S$, $g_i$, i) according to the fifth example additionally uses the master key $g_i$ as an argument.

In the fifth example, the client key function CKeyGen($K_S$, $g_i$, i) contains the second data conversion F$\beta$ and the third data conversion F$\gamma$ illustrated in FIG. 12. In this case, the third data conversion is F$\gamma_i$($K_i'$, $g_i$) using the client key $K_i'$ before conversion and the master key $g_i$ as arguments. Alternatively, in the fifth example, the client key function may be CKeyGen($K_S$, $g_i$, i, w) and generate a client key $K_i$ specified by an index i on the basis of the index i, a server key $K_S$, a master key $g_i$ and management information w. In this case, the third data conversion may be F$\gamma_i$($K_i'$, $g_i$, w) and generate a converted client key $K_i$ on the basis of the client key $K_i'$ before conversion, the master key $g_i$, and the management information w.

For example, the third data conversion F$\gamma$ may be a function that outputs an arithmetic sum, an arithmetic product, or an exclusive OR of the client key $K_i'$ before conversion and the master key $g_i$ as indicated by Expressions (80) to (82) below. Expression (82) is an expression when $K_i'$ and $g_i$ have the same bit length.

$$F\delta_i(K_i',g_i)=K_i'+g_i \quad (80)$$

$$F\delta_i(K_i',g_i)=K_i'\times g_i \quad (81)$$

$$F\delta_i(K_i',g_i)=K_i'\oplus g_i \quad (82)$$

For another example, the third data conversion $F\gamma_i$ may be a function that outputs a result of operation on the client key $K_i'$ before conversion, the master key $g_i$, and the management information w as indicated by Expression (83) below.

$$F\gamma_i(K_i',g_i,w)=K_i'\circ g_i\circ w \quad (83)$$

For another example, the third data conversion $F\gamma_i$ may be a function that outputs a sequence obtained by converting the sum, the product, or the exclusive OR of the client key $K_i'$ before conversion, the master key $g_i$, and the management information w with a function $F_{12}$ as indicated by Expression (84) below. As an example, $F_{12}$ is a one-to-one function, a pseudo-random function, or a hash function. $F_{12}$ outputs $l_i$ bits for an input of $l_i$ bits.

$$F\delta_i(K_i',g_i,w)=F_{12}(K_i'\circ g_i\circ w) \quad (84)$$

For another example, the third data conversion $F\gamma_i$ may assume $K_i'$ as a row vector and multiply $K_i'$ by an invertible matrix $g_i$ from the right as indicated by Expression (85) below. For example, the third data conversion $F\gamma_i$ performs the calculation assuming one bit of $K_i$ as an element of a vector and a row vector of $1\times l_i$, and $g_i$ as an invertible matrix $l_i\times l_i$. Alternatively, for example, the third data conversion $F\gamma_i$ may perform calculation assuming that a number represented by a plurality of bits in $K_i'$ as an element of a vector.

$$F\delta_i(K_i',g_i)=K_i'\times g_i \quad (85)$$

For another example, the third data conversion $F\gamma_i$ may assume $K_i'$ as a column vector and add the product of a matrix w and the column vector $g_i$ as indicated by Expression (86) below. For example, the third data conversion $F\gamma_i$, performs the calculation assuming one bit of $K_i'$ as an element of a vector and a column vector of $l_i\times 1$, w as a matrix of $l_i\times l_g$, and $g_i$ as a column vector of $l_g\times 1$. Alternatively, for example, the third data conversion $F\gamma_i$ may perform calculation assuming that a number represented by a plurality of bits in $K_i'$, $g_i$, and w as an element of a vector.

$$F\gamma_i(K_i',g_i,w)=K_i'+w\times g_i \quad (86)$$

For another example, the third data conversion $F\gamma_i$ may output a result of operation of a sequence obtained by converting the client key $K_i$ with a function $F_{12}$ and a sequence obtained by converting the master key $g_i$ by a function $F_{13}$, as indicated by Expression (87) below. As an example, $F_{13}$ is a one-to-one function, a pseudo-random function, or a hash function.

$$F\gamma_i(K_i',g_i)=F_{12}(K_i')\circ F_{13}(g_i) \quad (87)$$

The third data function $F\gamma_i$ is not limited to such functions, but may be any function for converting the client key $K_i'$ before conversion with the master key $g_i$, the management information w, or the like, into the client key $K_i$.

Consider a case in which the client key function CKeyGen($K_S$, i, $g_i$) assumes that an output of a function H(i) represents a bit position in $K_S$ and generates a client key by concatenating bits at such positions in $K_S$. The function H is a hash function, a pseudo random function, or the like. A function H(i∘$g_i$) in the client key function CKeyGen($K_S$, i, $g_i$) outputs bit positions in the server key $K_S$ on the basis of the index i and the master key $g_i$. The function H(i∘$g_i$∘w) in the client key function CKeyGen($K_S$, i, $g_i$, w) may output bit positions in the server key $K_S$ on the basis of the index i, the master key $g_i$, and the management information w.

In the fifth example, the update unit 60 then updates the client key $K_i$ to be updated and updates the master key $g_i$ to update the client key $K_i$ to be updated.

The update unit 60 includes an input unit 80, a random number generator 81, a first update information generator 84, a second update information generator 85, and an output unit 83 as illustrated in FIG. 25.

The first update information generator 84 includes a master key generator 95. The master key generator 95 generates a new master key $g_i$ on the basis of a random number generated by the random number generator 81.

The second update information generator 85 includes a client key generator 94. The client key generator 94 generates a new client key $K_i$ on the basis of the index i input by the input unit 80, the existing client key function CKeyGen ($K_S$, $g_i$, i), the new master key $g_i$, and the existing server key $K_S$.

The output unit 83 outputs the new master key $g_i$ generated by the first update information generator 84 as server key update information sri to the server 40. The output unit 83 also outputs, for each of the client terminals 30 storing the client keys $K_i$ to be updated, the new client key $K_i$ generated by the second update information generator 85 as the client key update information cri.

In the fifth example, when the client keys $K_i$ are seeds for generating the encryption keys $EK_i$, the client key generator 94 may store a combined function CEKGen($K_S$, $g_i$, i) obtained by combining the client key function CKeyGen ($K_S$, $g_i$, i) and the conversion function $F\delta_i$. In this case, the client key generator 94 generates a new encryption key $EK_i$ on the basis of the index i input by the input unit 80, the combined function CEKGen($K_S$, $g_i$, i), the new master key $g_i$ and the existing server key $K_S$. In this case, the output unit 83 then outputs the new encryption key $EK_i$ as the client key update information cri.

Figure 26:
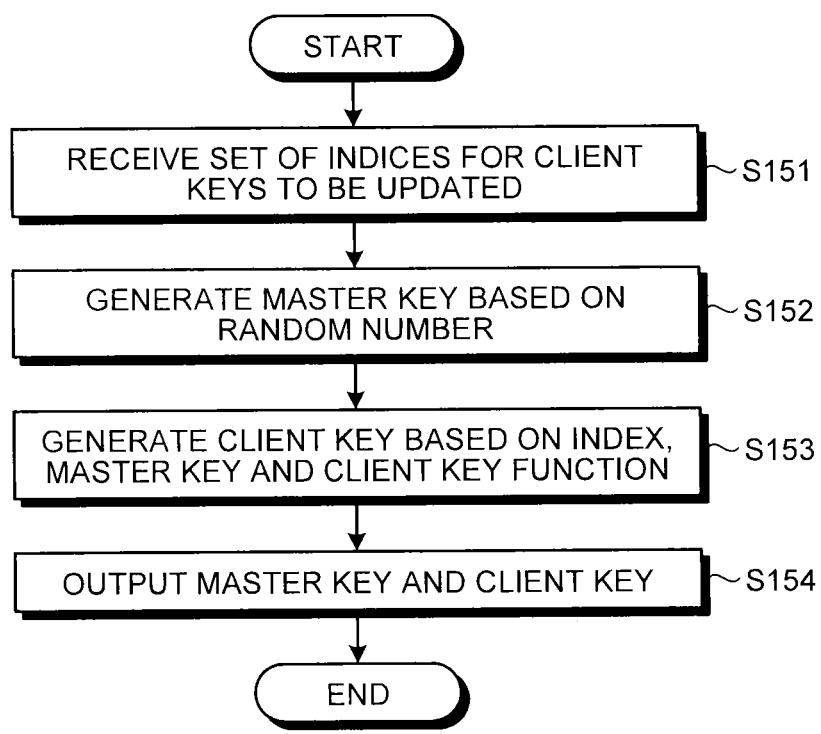
FIG. 26 is a flowchart of a process performed by the update unit according to the fifth example.

FIG. 26 is a flowchart of a process performed by the update unit 60 according to the fifth example. To begin with, at Step S151, the input unit 80 in the update unit 60 receives as input a set of indices i for specifying the client keys $K_i$ to be updated.

Subsequently, at Step S152, the first update information generator 84 generates a master key $g_i$ on the basis of a random number. Subsequently, at Step S153, the second update information generator 85 generates a new client key $K_i$ on the basis of the index i input by the input unit 80, the existing server key $K_S$, the new master key $g_i$, and the existing client key function CKeyGen($K_S$, $g_i$, i).

At Step S154, the output unit 83 then outputs the master key $g_i$ to the server 40. The output unit 83 also outputs, for each of the client terminals 30 storing the client keys $K_i$ to be updated, the new client key $K_i$.

Figure 27:
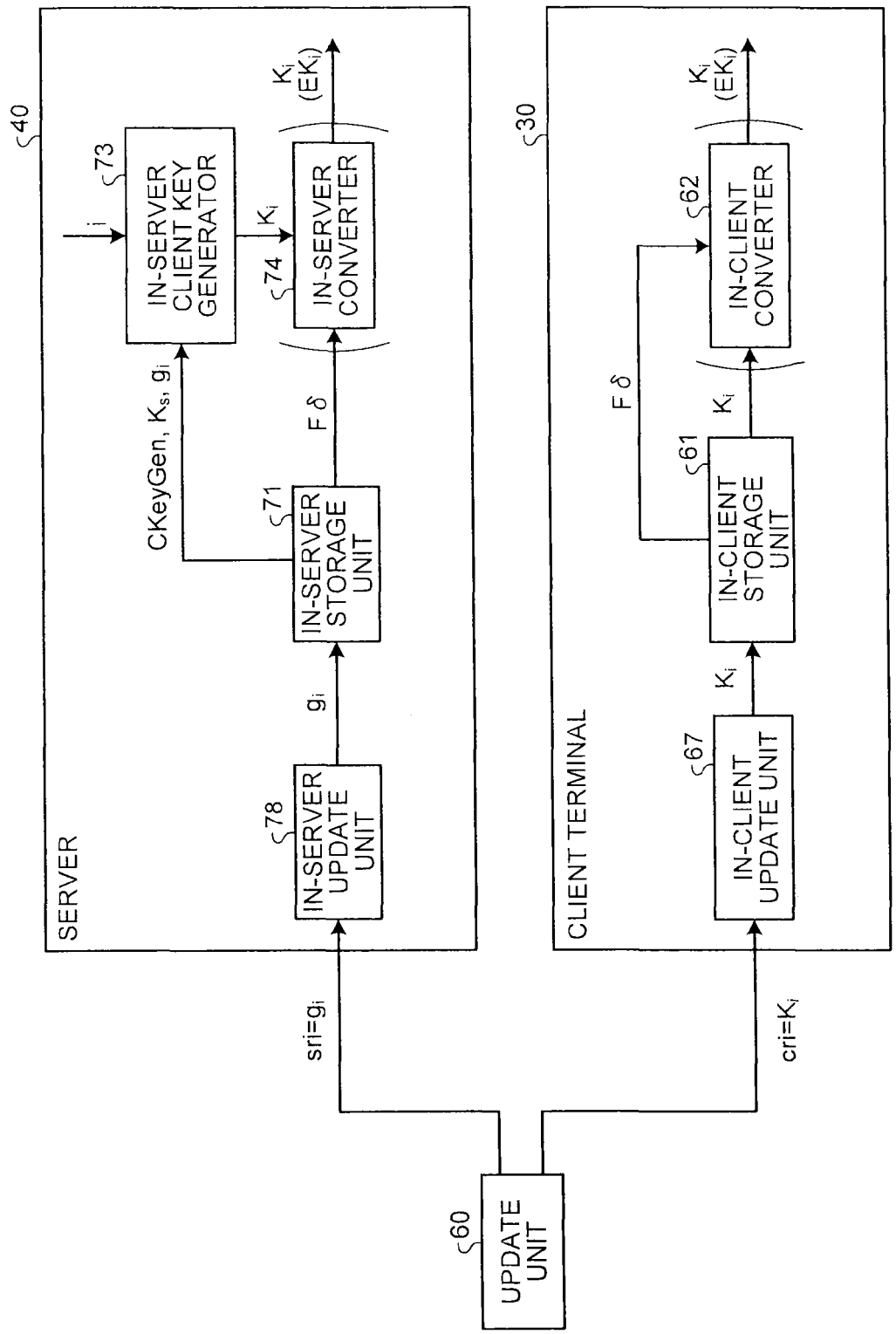
FIG. 27 is a schematic diagram of the configurations of a client terminal and a server according to the fifth example.

FIG. 27 is a schematic diagram of partial configurations of a client terminal 30 and the server 40 with the update unit 60 according to the fifth example. In the fifth example, the in-server update unit 78 in the server 40 acquires the master key $g_i$. The in-server update unit 78 replaces the existing master key $g_i$ stored in the in-server storage unit 71 with the acquired new master key $g_i$.

In encryption and decryption, the in-server client key generator 73 generates a new client key $K_i$ on the basis of an index i, the new master key $g_i$ stored in the in-server storage unit 71, the existing client key function CKeyGen($K_S$, $g_i$, i)

and the existing server key $K_S$ stored in the in-server storage unit 71. In this manner, the server 40 can conduct encrypted communication with the client terminals 30 by using the new client key $K_i$.

In the fifth example, when the client keys $K_i$ are seeds for generating the encryption keys $EK_i$, the in-server storage unit 71 may store a new combined function CEKGen($K_S$, $g_i$, i) obtained by combining the client key function CKeyGen ($K_S$, $g_i$, i) and the conversion function $F\delta_i$. In this case, in encryption and decryption, the in-server client key generator 73 generates a new encryption key $EK_i$ on the basis of an index i, the new master key $g_i$, the combined function CEKGen($K_S$, $g_i$, i) stored in the in-server storage unit 71, and the existing server key $K_S$. In this manner, the server 40 can conduct encrypted communication with the client terminals 30 by using the new encryption keys $EK_i$.

According to the update unit 60 according to the fifth example, the client key $K_i$ or the encryption key $EK_i$ can be updated by updating the client key function CKeyGen($K_S$, $g_i$, i) by using the master key $g_i$. The channel over which the generating device 20 transmits the server key update information sri and the client key update information cri is preferably a secure channel but may be a channel that is not secure.

As described above, according to the encryption system 10 according to the first embodiment, some of multiple client keys $K_i$ or encryption keys $EK_i$ can be easily updated even when part of each of the client keys $K_i$ is correlated with other client keys $K_i$. Furthermore, when the client keys $K_i$ are seeds for generating the encryption keys $EK_i$, the client key update information cri contains the client key $K_i$, the master key $g_i$, or the conversion function $F\delta_i$, and encryption keys $EK_i$ are not leaked and keys can be safely updated even if any of the client key update information cri is leaked.

Second Embodiment

Figure 28:
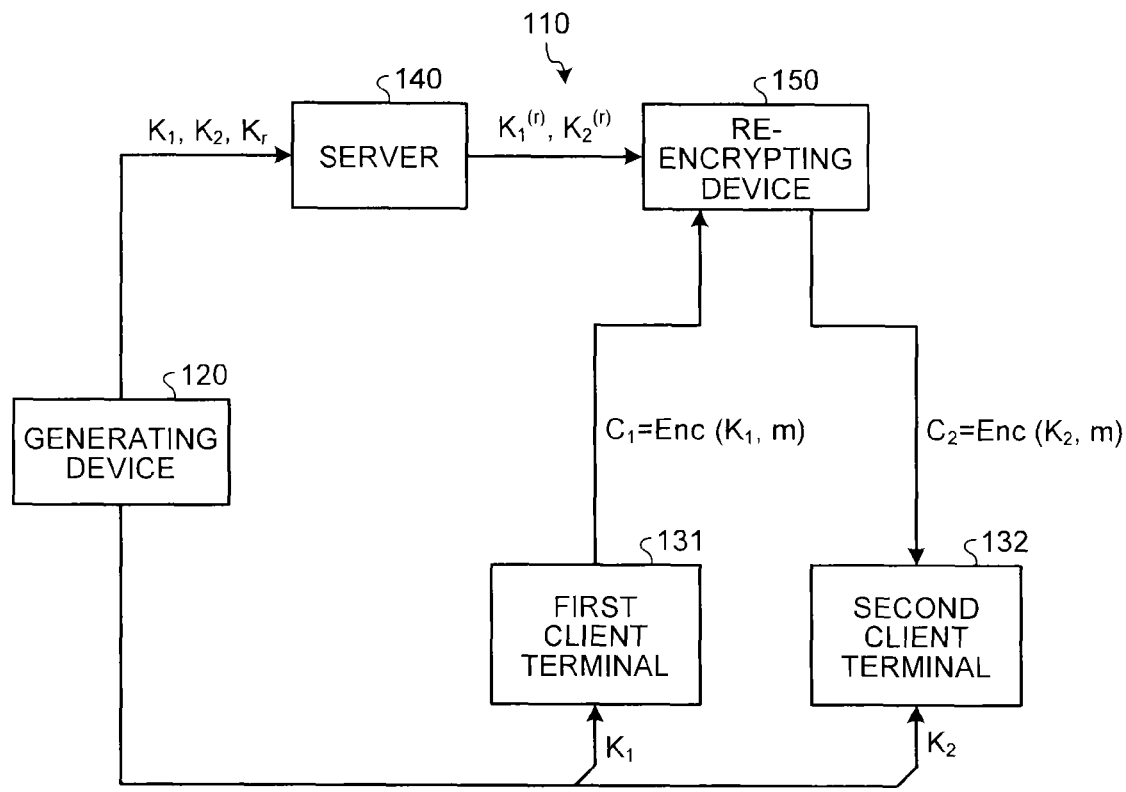
FIG. 28 is a schematic diagram of the configuration of an encryption system according to a second embodiment.

FIG. 28 is a schematic diagram of the configuration of an encryption system 110 according to a second embodiment. The encryption system 110 includes a generating device 120, a first client terminal 131, a second client terminal 132, a server 140, and a re-encrypting device 150.

The generating device 120 generates a first client key $K_1$, a second client key $K_2$, and a master key $K_r$. As an example, the generating device 120 generates a client key $K_1$, a client key $K_2$, and a master key $K_r$ on the basis of a random number generated by a random number generator.

The generating device 120 outputs the first client key $K_1$ to the first client terminal 131. The generating device 120 outputs the second client key $K_2$ to the second client terminal 132. The generating device 120 further outputs the first client key $K_1$, the second client key $K_2$, and the master key $K_r$ to the server 140. The generating device 120 may output a server key $K_S$ and a client key rule for generating the first client key $K_1$ and the second client key $K_2$ to the server 140 similarly to the generating device 20 of the first embodiment instead of the first client key $K_1$ and the second client key $K_2$.

The server 140 acquires the client key $K_1$, the client key $K_2$, and the master key $K_r$ from the generating device 120. The server 140 generates a first re-encryption key $K_1^{(r)}$ obtained by encrypting the first client key $K_1$ with the master key $K_r$. The server 140 also generates a second re-encryption key $K_2^{(r)}$ obtained by encrypting the second client key $K_2$ with the master key $K_r$. The server 140 outputs the first re-encryption key $K_1^{(r)}$ and the second re-encryption key $K_2^{(r)}$ to the re-encrypting device 150 in response to a request from the re-encrypting device 150. The generating device 120 and the server 140 may be integrated.

The first client terminal 131 acquires and stores the first client key $K_1$ from the generating device 120. The first client terminal 131 generates a first ciphertext $C_1$ (=Enc($k_1$, m)) obtained by encrypting a plaintext m with the first client key $K_1$. The first client terminal 131 outputs the first ciphertext $C_1$ to the re-encrypting device 150.

The re-encrypting device 150 acquires the first ciphertext $C_1$ from the first client terminal 131. The re-encrypting device 150 outputs a request to the server 140 in response to the acquisition of the first ciphertext $C_1$ to acquire the first re-encryption key $K_1^{(r)}$ and the second re-encryption key $K_2^{(r)}$.

The re-encrypting device 150 generates a second ciphertext $C_2$ (=Enc($k_2$, m)) obtained by encrypting a plaintext m with the second client key $K_2$ on the basis of the first ciphertext $C_1$, the first re-encryption key $K_1^{(r)}$ and the second re-encryption key $K_2^{(r)}$. The re-encrypting device 150 then outputs the second ciphertext $C_2$ to the second client terminal 132.

The second client terminal 132 acquires and stores the second client key $K_2$ from the generating device 120. The second client terminal 132 acquires the second ciphertext $C_2$ from the re-encrypting device 150. The second client terminal 132 decrypts the second ciphertext $C_2$ with the second client key $K_2$ to generate the plaintext m.

A configuration of the re-encrypting device 150 when exclusive OR operation is used as an encryption process will be described. In this case, the plaintext m, the first client key $K_1$, the second client key $K_2$, the master key $K_r$, the first re-encryption key $K_1^{(r)}$, the second re-encryption key $K_2^{(r)}$ a combined key $K_{1,2}^{(r)}$, the first ciphertext $C_1$, and the second ciphertext $C_2$ are all binary data having the same bit length.

Figure 29:
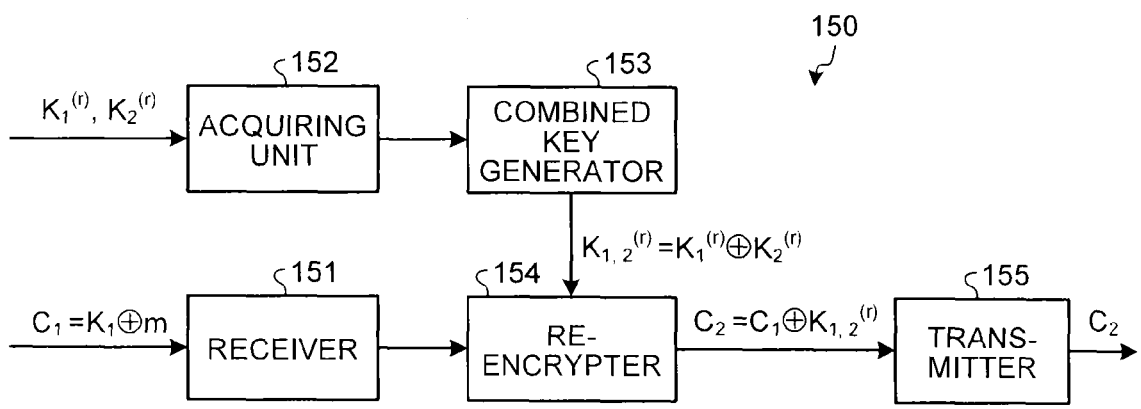
FIG. 29 is a schematic diagram of the configuration of a re-encrypting device.

FIG. 29 is a schematic diagram illustrating a configuration of the re-encrypting device 150. The re-encrypting device 150 includes a receiver 151, an acquiring unit 152, a combined key generator 153, a re-encrypter 154, and a transmitter 155.

The receiver 151 receives the first ciphertext $C_1$ obtained by exclusive OR operation of the plaintext m and the first client key $K_1$ from the first client terminal 131. The acquiring unit 152 acquires the first re-encryption key $K_1^{(r)}$ obtained by exclusive OR operation of the first client key $K_1$ and the master key $K_r$ from the server 140. The acquiring unit 152 also acquires the second re-encryption key $K_2^{(r)}$ obtained by exclusive OR operation of the second client key $K_2$ and the master key $K_r$.

The combined key generator 153 generates a combined key $K_{1,2}^{(r)}$ by exclusive OR operation of the first re-encryption key $K_1^{(r)}$ and the second re-encryption key $K_2^{(r)}$ obtained by the acquiring unit 152. The re-encrypter 154 generates the second ciphertext $C_2$ by exclusive OR operation of the first ciphertext $C_1$ received by the receiver 151 and the combined) key $K_{1,2}^{(r)}$ generated by the combined key generator 153. The transmitter 155 transmits the second ciphertext $C_2$ generated by the re-encrypter 154 to the second client terminal 132.

Figure 30:
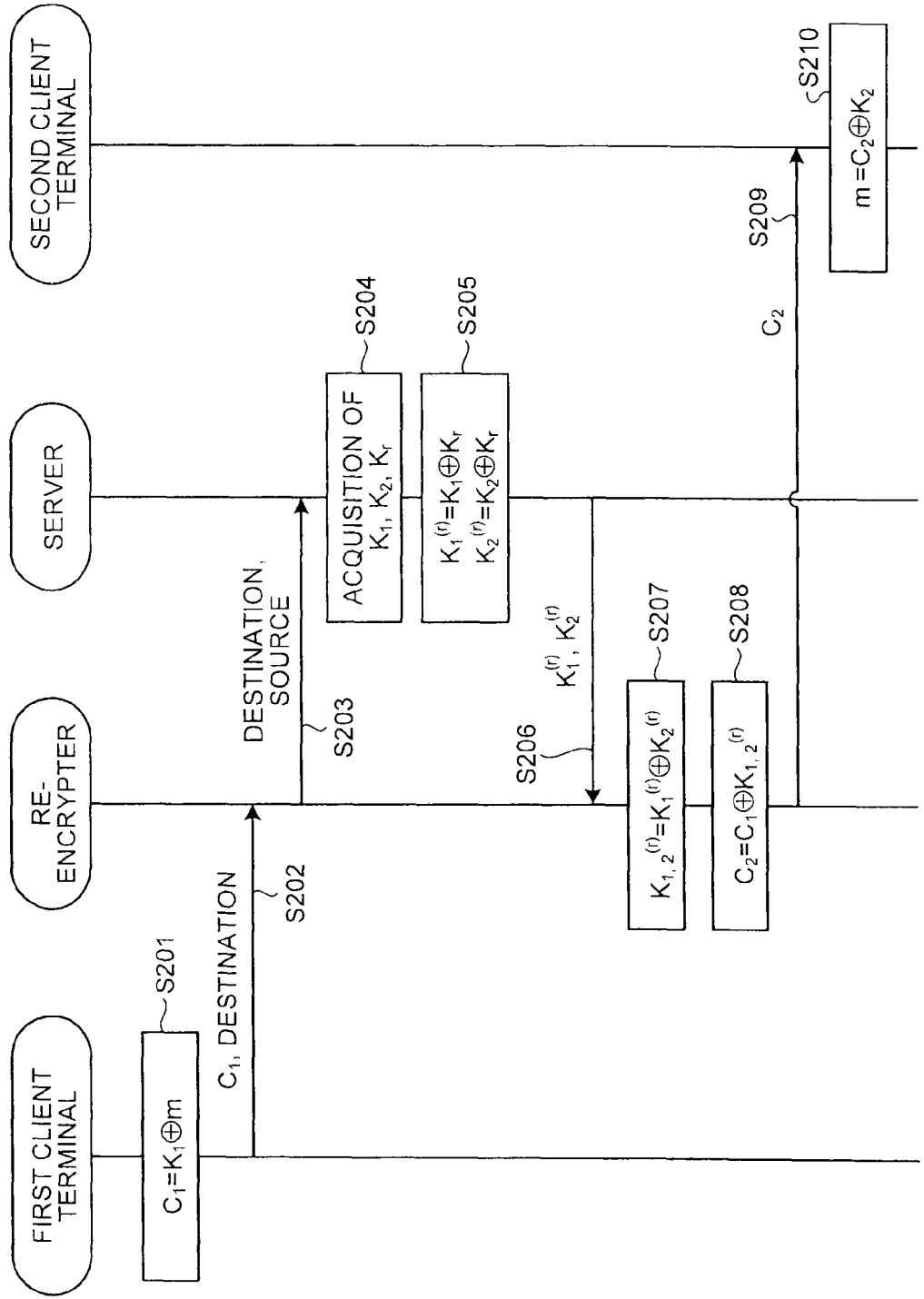
FIG. 30 is a flowchart of a process performed by the encryption system according to the second embodiment.

FIG. 30 is a flowchart of a process performed by the encryption system 110 according to the second embodiment. For transferring a plaintext m through encrypted communication from the first client terminal 131 to the second client terminal 132, the process of the following Steps S201 to S210 is performed.

First, at Step S201, the first client terminal 131 generates a first ciphertext $C_1$ obtained by exclusive OR operation of the plaintext m and the first client key $K_1$ as indicated by Expression (101) below.

$$C_1 = K_1 \oplus m \tag{101}$$

Subsequently, at Step S202, the first client terminal 131 outputs the first ciphertext $C_1$ to the re-encrypting device 150. In this case, the first client terminal 131 also outputs information specifying a destination (second client terminal 132) to the re-encrypting device 150.

Subsequently, at Step S203, the re-encrypting device 150 outputs a request to the server 140 in response to acquisition of the first ciphertext $C_1$ from the first client terminal 131. In this case, the re-encrypting device 150 also outputs information specifying the source (first client terminal 131) and the destination (second client terminal 132) to the server 140.

Subsequently, at Step S204, the server 140 acquires the first client key $K_1$ stored in the first client terminal 131 that is the source, the second client key $K_2$ stored in the second client terminal 132 that is the destination, and the master key $K_r$. As an example, the server 140 acquires in advance and stores the first client key $K_1$, the second client key $K_2$, and the master key $K_r$ from the generating device 120. As an example, the server 140 may acquire the keys from the generating device 120 after receiving a request from the re-encrypting device 150. Alternatively, the server 140 may use a random number generated by a random number generator provided therein as a master key $K_r$ instead of acquiring the master key $K_r$ from the generating device 120.

Subsequently, at Step S205, the server 140 generates the first re-encryption key $K_1^{(r)}$ obtained by exclusive OR operation of the first client key $K_1$ and the master key $K_r$ as indicated by Expression (102) below. The server 140 also generates the second re-encryption key $K_2^{(r)}$ obtained by exclusive OR operation of the second client key $K_2$ and the master key $K_r$ as indicated by Expression (103).

$$K_1^{(r)} = K_1 \oplus K_r \tag{102}$$

$$K_2^{(r)} = K_2 \oplus K_r \tag{103}$$

Subsequently, at Step S206, the server 140 returns the first re-encryption key $K_1^{(r)}$ and the second re-encryption key $K_2^{(r)}$ to the re-encrypting device 150.

Subsequently, at Step S207, the re-encrypting device 150 generates a combined key $K_{1,2}^{(r)}$ by exclusive OR operation of the first re-encryption key $K_1^{(r)}$ and the second re-encryption key $K_2^{(r)}$ as indicated by Expression (104) below in response to acquisition of the first re-encryption key $K_1^{(r)}$ and the second re-encryption key $K_2^{(r)}$.

$$K_{1,2}^{(r)} = K_1^{(r)} \oplus K_2^{(r)} \tag{104}$$

Subsequently, at Step S208, the re-encrypting device 150 generates the second ciphertext $C_2$ by exclusive OR operation of the first ciphertext $C_1$ and the combined key $K_{1,2}^{(r)}$ as indicated by Expression (105) below.

$$C_2 = C_1 \oplus K_{1,2}^{(r)} \tag{105}$$

Subsequently, at Step S209, the re-encrypting device 150 then outputs the second ciphertext $C_2$ to the second client terminal 132.

The exclusive OR operation of the second ciphertext $C_2$ and the first client key $K_1$ is expressed as in Expression (106) below.

$$C_2 \oplus K_2 = (C_1 \oplus K_{1,2}^{(r)}) \oplus K_2 \tag{106}$$

The first ciphertext $C_1$ is a value obtained by exclusive OR operation of the first client key $K_1$ and the plaintext m as indicated by Expression (101). The combined key $K_{1,2}^{(r)}$ is a value obtained by exclusive OR operation of the first client key $K_1$ and the second client key $K_2$ as indicated by Expression (107) below.

$$K_{1,2}^{(r)} = (K_1 \oplus K_r) \oplus (K_2 \oplus K_r) = K_1 \oplus K_2 \tag{107}$$

Thus, as a result of substituting Expression (101) and Expression (107) into Expression (106), only the plaintext m remains on the right side.

Thus, at Step S210, the second client terminal 132 generates the plaintext m by exclusive OR operation of the second ciphertext $C_2$ and the second client key $K_2$ as indicated by Expression (108) below in response to reception of the second ciphertext $C_2$. As a result, the second client terminal 132 can acquire the plaintext m transmitted from the first client terminal 131.

$$m = C_2 \oplus K_2 \tag{108}$$

The re-encrypting device 150 may acquire one or both of the first re-encryption key $K_1^{(r)}$ and the second re-encryption key $K_2^{(r)}$ from the server 140. In this case, when the first client key $K_1$ and the second client key $K_2$ are updated, the server 140 transmits an updated first re-encryption key $K_1^{(r)}$ and second re-encryption key $K_2^{(r)}$ to the re-encrypting device 150. The re-encrypting device 150 may add the updated first re-encryption key $K_1^{(r)}$ and second re-encryption key $K_2^{(r)}$ to or write the updated first re-encryption key $K_1^{(r)}$ and second re-encryption key $K_2^{(r)}$ over the previous first re-encryption key $K_1^{(r)}$ and second re-encryption key $K_2^{(r)}$.

As described above, the re-encrypting device 150 according to the second embodiment can convert a first ciphertext $C_1$ obtained by encrypting a plaintext m with a first client key $K_1$ into a second ciphertext $C_2$ obtained by encrypting the plain text m with a second client key $K_2$ without knowing the first client key $K_1$ and the second client key $K_2$.

Figure 31:
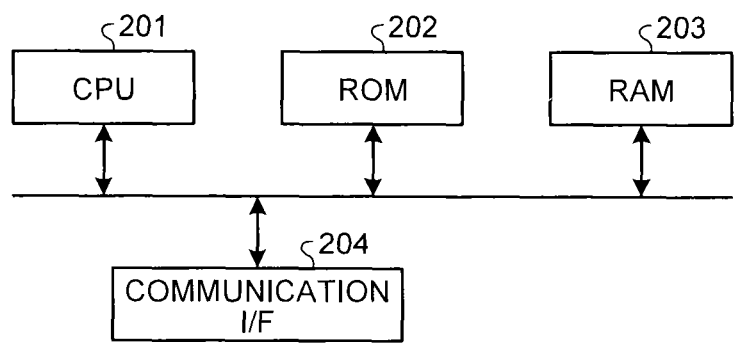
FIG. 31 is a schematic diagram of a hardware configuration of a computer.

FIG. 31 is a schematic diagram of an example of hardware configurations of the generating device 20, the client terminals 30, the server 40, and the re-encrypting device 150. Each of the generating device 20, the client terminals 30, the server 40, and the re-encrypting device 150 includes a controller such as a central processing unit (CPU) 201, storage devices such as a read-only memory (ROM) 202 and a random access memory (RAM) 203, a communication interface (I/F) 204 for connecting to a network and establishing communications, and a bus for connecting these components.

Programs to be executed by the generating device 20, the client terminals 30, the server 40, and the re-encrypting device 150 according to the embodiments are embedded on the ROM 202 or the like in advance and provided therefrom. The programs may alternatively be recorded on a computer readable recording medium such as a compact disk read only memory (CD-ROM), a flexible disk (FD), a compact disk recordable (CD-R), and a digital versatile disk (DVD) in a form of a file that can be installed or executed, and provided as a computer program product.

Alternatively, the programs may be stored on a computer system connected to a network such as the Internet, and provided by being downloaded via the network. Still alternatively, the programs may be provided or distributed through a network such as the Internet.

A program to be executed in the generating device 20 according to the embodiments can make a computer function as the components (the input unit 51, the random number generator 52, the server key generator 53, the client key generator 54, and the output unit 55) of the generating device 20 described above. The whole or part of the input unit 51, the random number generator 52, the server key generator 53, the client key generator 54, and the output unit 55 may be implemented by hardware.

A program to be executed in the client terminals 30 according to the embodiments can make a computer function as the components (the in-client storage unit 61, the in-client converter 62, the in-client encrypter 63, the in-client transmitter 64, the in-client receiver 65, the in-client decrypter 66, and the in-client update unit 67) of the client terminals 30 described above. The whole or part of the in-client storage unit 61, the in-client converter 62, the in-client encrypter 63, the in-client transmitter 64, the in-client receiver 65, the in-client decrypter 66, and the in-client update unit 67 may be implemented by hardware.

A program to be executed in the server 40 according to the embodiments can make a computer function as the components (the in-server storage unit 71, the in-server receiver 72, the in-server client key generator 73, the in-server converter 74, the in-server decrypter 75, the in-server encrypter 76, the in-server transmitter 77, and the in-server update unit 78) of the server 40 described above. The whole or part of the in-server storage unit 71, the in-server receiver 72, the in-server client key generator 73, the in-server converter 74, the in-server decrypter 75, the in-server encrypter 76, the in-server transmitter 77, and the in-server update unit 78 may be implemented by hardware.

A program to be executed in the re-encrypting device 150 according to the embodiments can make a computer function as the components (the receiver 151, the acquiring unit 152, the combined key generator 153, the re-encrypter 154, and the transmitter 155) of the re-encrypting device 150 described above. The whole or part of the receiver 151, the acquiring unit 152, the combined key generator 153, the re-encrypter 154, and the transmitter 155 may be implemented by hardware.

In the computer, the CPU 201 can read out programs from a computer-readable storage medium onto a main storage and execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A generating device comprising:
a hardware processor that functions as:
  a first key generator that generates a first key that is a sequence of bits according to a first key rule for generating the first key on the basis of a random number;
  a second key generator that generates multiple second keys that are sequences of bits partially having correlation with one another according to a second key rule for generating the second keys on the basis of the first key;
  an output unit that outputs the first key and at least one of the second keys, wherein the at least one of the second keys are used for encrypting data that is exchanged between at least a first client terminal and a second client terminal; and
  an update unit that generates update information for updating any one of the second keys by updating a partial sequence of the any one of the second keys, the partial sequence having no correlation with the other second keys not to be updated.

2. The device according to claim 1, wherein the update unit
generates first update information for updating the second key to be updated output from the output unit, and
generates second update information for updating the second key to be updated generated from the first key and the second key rule by updating at least one of the second key rule and the first key output from the output unit.

3. The device according to claim 2, wherein
the second keys are seeds for generating encryption keys,
the second key generator generates, for each of the second keys, a conversion function for converting the second key to an encryption key,
the output unit outputs the second key and the corresponding conversion function, and
the update unit generates the first update information for updating the second key to be updated or for updating the conversion function corresponding to the second key to be updated.

4. The device according to claim 2, wherein the update unit generates the second update information for updating the second key to be updated by updating bits of the first key, the bits being a seed for the second key to be updated but not being any of seeds for the other second keys not to be updated.

5. The device according to claim 2, wherein
the second key rule contains different functions for the respective second keys to be generated,
the output unit outputs a master function for generating the second key rule from a master key together with the first key, and
the update unit update updates the master key to generate the second update information for updating the second key to be updated by updating the function corresponding to the second key to be updated contained in the second key rule.

6. The device according to claim 2, wherein
the second key rule contains different functions for the respective second keys to be generated, and
the update unit generates second update information for updating the second key to be updated by updating the function corresponding to the second key to be updated contained in the second key rule.

7. The device according to claim 2, wherein
the second key rule is for generating a second key specified by an index specifying one of the second keys on the basis of the index, the first key, and a master key, and
the update unit generates the second update information for updating the second key to be updated by updating the master key.

8. A generating method comprising:
generating a first key that is a sequence of bits according to a first key rule for generating the first key on the basis of a random number;
generating multiple second keys that are sequences of bits partially having correlation with one another according to a second key rule for generating the second keys on the basis of the first key;

outputting the first key and at least one of the second keys, wherein the at least one of the second keys are used for encrypting data that is exchanged between at least a first client terminal and a second client terminal; and generating update information for updating any one of the second keys by updating a partial sequence of the any one of the second keys, the partial sequence having no correlation with the other second keys not to be updated.

9. A non-transitory computer-readable medium storing therein a program executable by a computer processor, the program when executed causing the computer processor to perform:

generating a first key that is a sequence of bits according to a first key rule for generating the first key on the basis of a random number;

generating multiple second keys that are sequences of bits partially having correlation with one another according to a second key rule for generating the second keys on the basis of the first key;

outputting the first key and at least one of the second keys, wherein the at least one of the second keys are used for encrypting data that is exchanged between at least a first client terminal and a second client terminal; and generating update information for updating any one of the second keys by updating a partial sequence of the any one of the second keys, the partial sequence having no correlation with the other second keys not to be updated.

10. A re-encrypting device comprising:
a hardware processor that functions as:
  a receiver that receives a first ciphertext obtained by exclusive OR operation of a plaintext and a first client key from a first client terminal;
  an acquiring unit that acquires a first re-encryption key obtained by exclusive OR operation of the first client key and a master key, and a second re-encryption key obtained by exclusive OR operation of a second client key stored in a second client terminal and the master key;
  a combined key generator that generates a combined key obtained by exclusive OR operation of the first re-encryption key and the second re-encryption key;
  a re-encrypter that generates a second ciphertext obtained by exclusive OR operation of the first ciphertext and the combined key; and
  a transmitter that transmits the second ciphertext to the second client terminal.

11. A re-encrypting method comprising:
receiving a first ciphertext obtained by exclusive OR operation of a plaintext and a first client key from a first client terminal;

acquiring a first re-encryption key obtained by exclusive OR operation of the first client key and a master key, and a second re-encryption key obtained by exclusive OR operation of a second client key stored in a second client terminal and the master key;

generating a combined key obtained by exclusive OR operation of the first re-encryption key and the second re-encryption key;

generating a second ciphertext obtained by exclusive OR operation of the first ciphertext and the combined key; and transmitting the second ciphertext to the second client terminal.

12. A non-transitory computer-readable medium storing therein a program executable by a computer processor, the program when executed causing the computer processor to perform:

receiving a first ciphertext obtained by exclusive OR operation of a plaintext and a first client key from a first client terminal;

acquiring a first re-encryption key obtained by exclusive OR operation of the first client key and a master key, and a second re-encryption key obtained by exclusive OR operation of a second client key stored in a second client terminal and the master key;

generating a combined key obtained by exclusive OR operation of the first re-encryption key and the second re-encryption key;

generating a second ciphertext obtained by exclusive OR operation of the first ciphertext and the combined key; and transmitting the second ciphertext to the second client terminal.

* * * * *